April 3, 1962 J. C. HOLLIS 3,027,782
MACHINE TOOL TRANSMISSION AND CONTROLS THEREFOR
Original Filed Aug. 1, 1955 14 Sheets-Sheet 1

INVENTOR.
John C. Hollis
BY
Carlson, Pitzner, Hubbard & Wolfe
Attys.

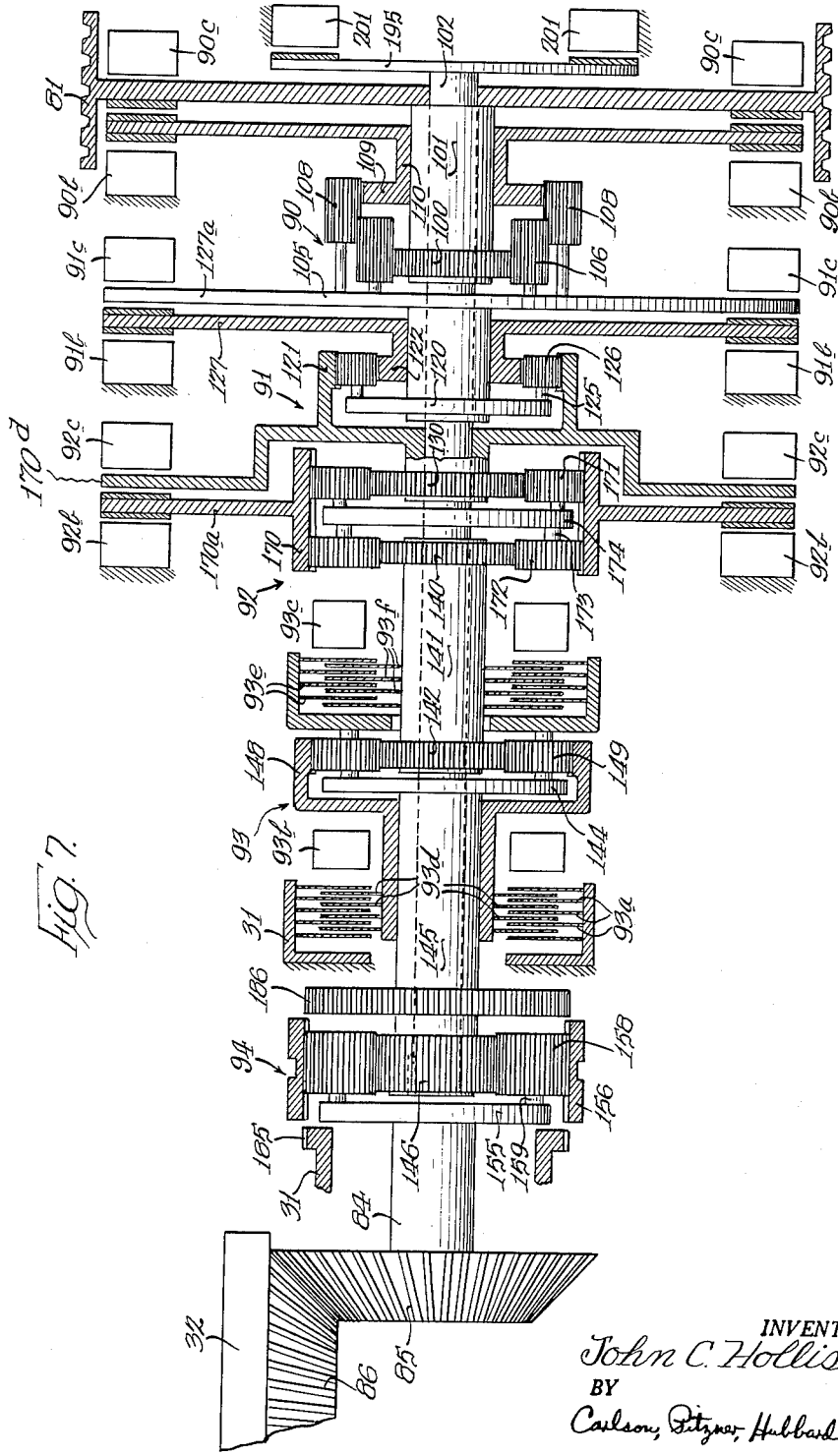

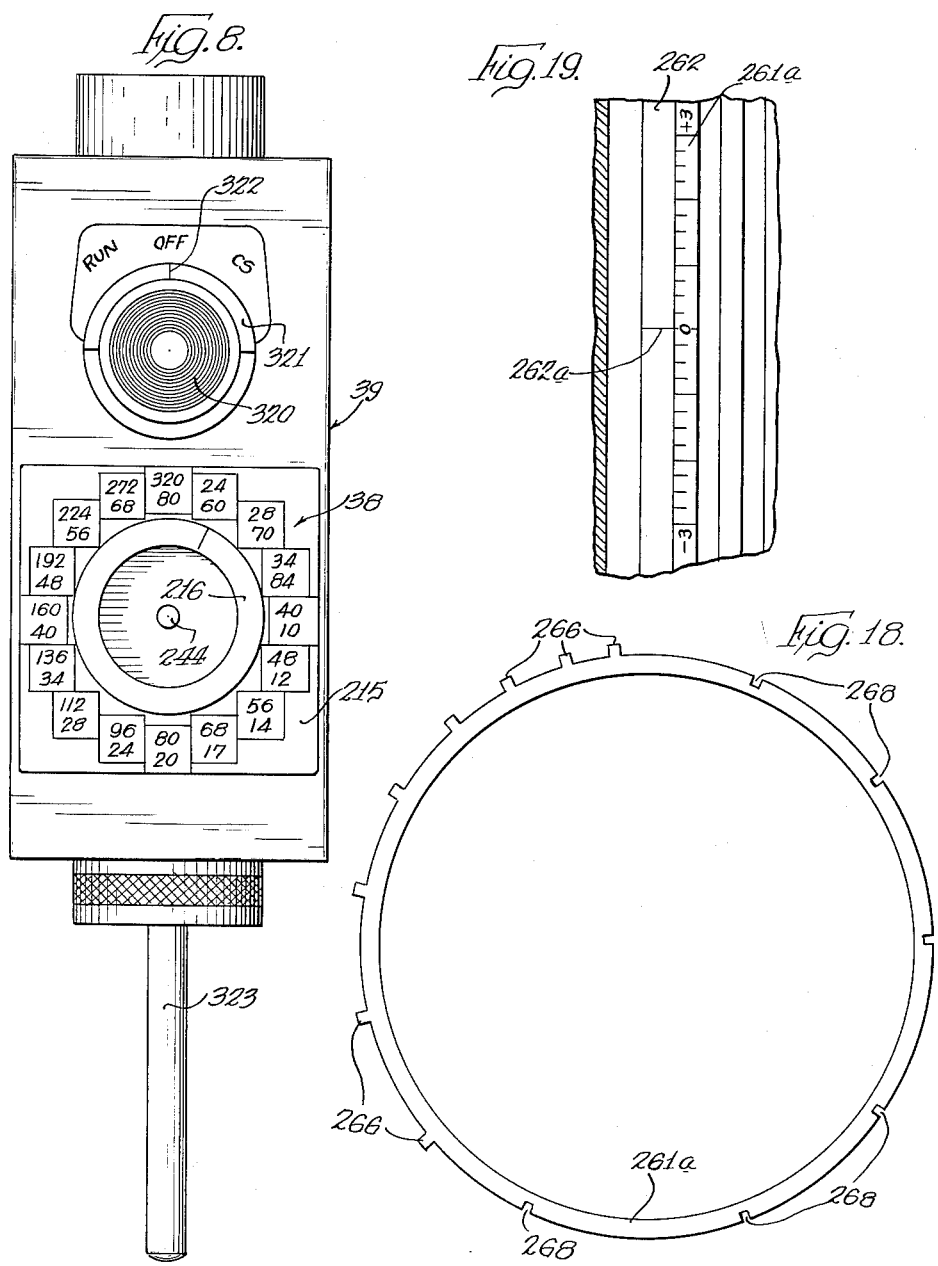

April 3, 1962 J. C. HOLLIS 3,027,782
MACHINE TOOL TRANSMISSION AND CONTROLS THEREFOR
Original Filed Aug. 1, 1955 14 Sheets-Sheet 8
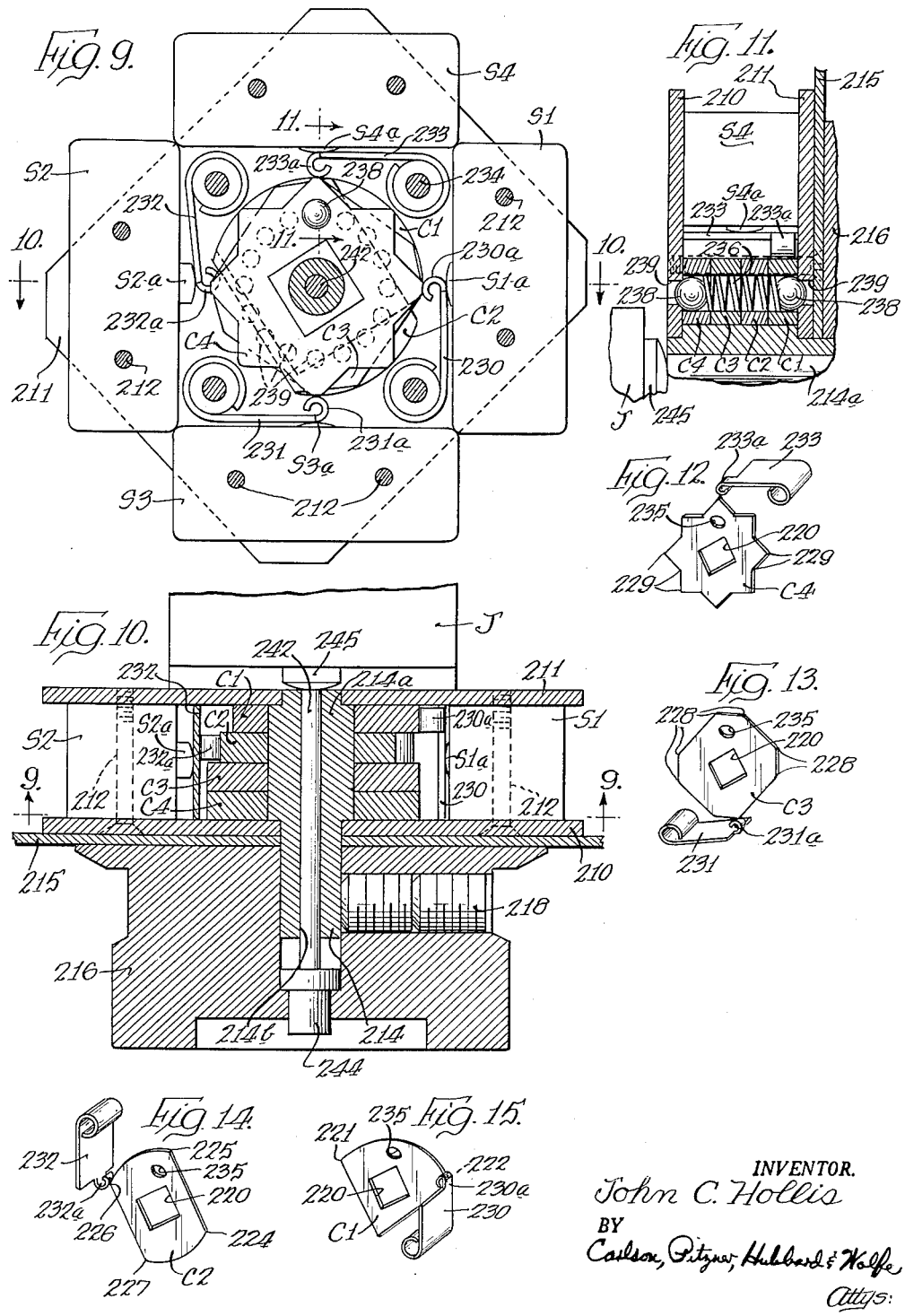
INVENTOR.
John C. Hollis
BY
Carlson, Pitzner, Hubbard & Wolfe
Attys.

April 3, 1962 J. C. HOLLIS 3,027,782
MACHINE TOOL TRANSMISSION AND CONTROLS THEREFOR
Original Filed Aug. 1, 1955 14 Sheets-Sheet 9

INVENTOR.
John C. Hollis
BY
Carlson, Pitzner, Hubbard & Wolfe
Attys.

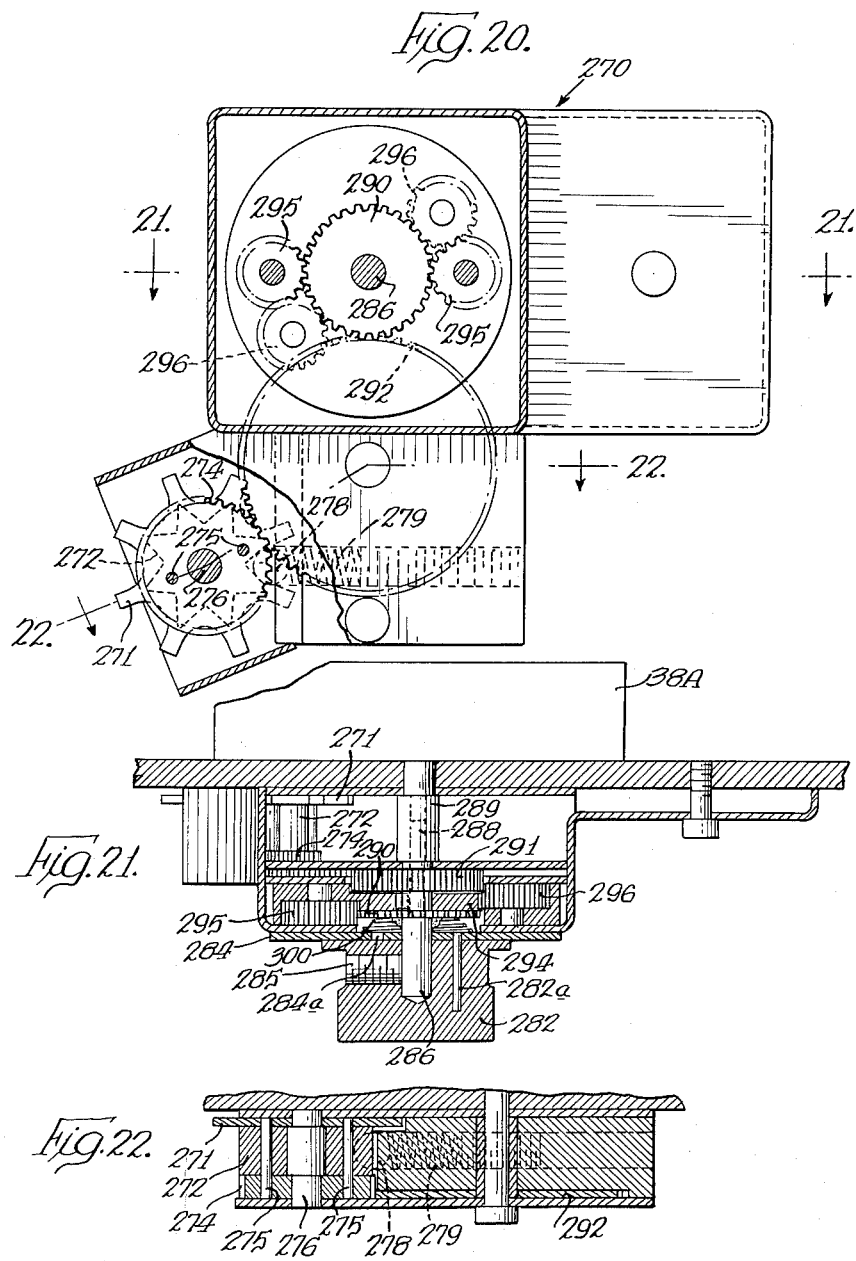

INVENTOR.
John C. Hollis
BY
Carlson, Pitzner, Hubbard & Wolfe
Attys.

April 3, 1962 J. C. HOLLIS 3,027,782
MACHINE TOOL TRANSMISSION AND CONTROLS THEREFOR
Original Filed Aug. 1, 1955 14 Sheets-Sheet 12

INVENTOR.
John C. Hollis
BY
Carlson, Pitzner, Hubbard & Wolfe
Attys.

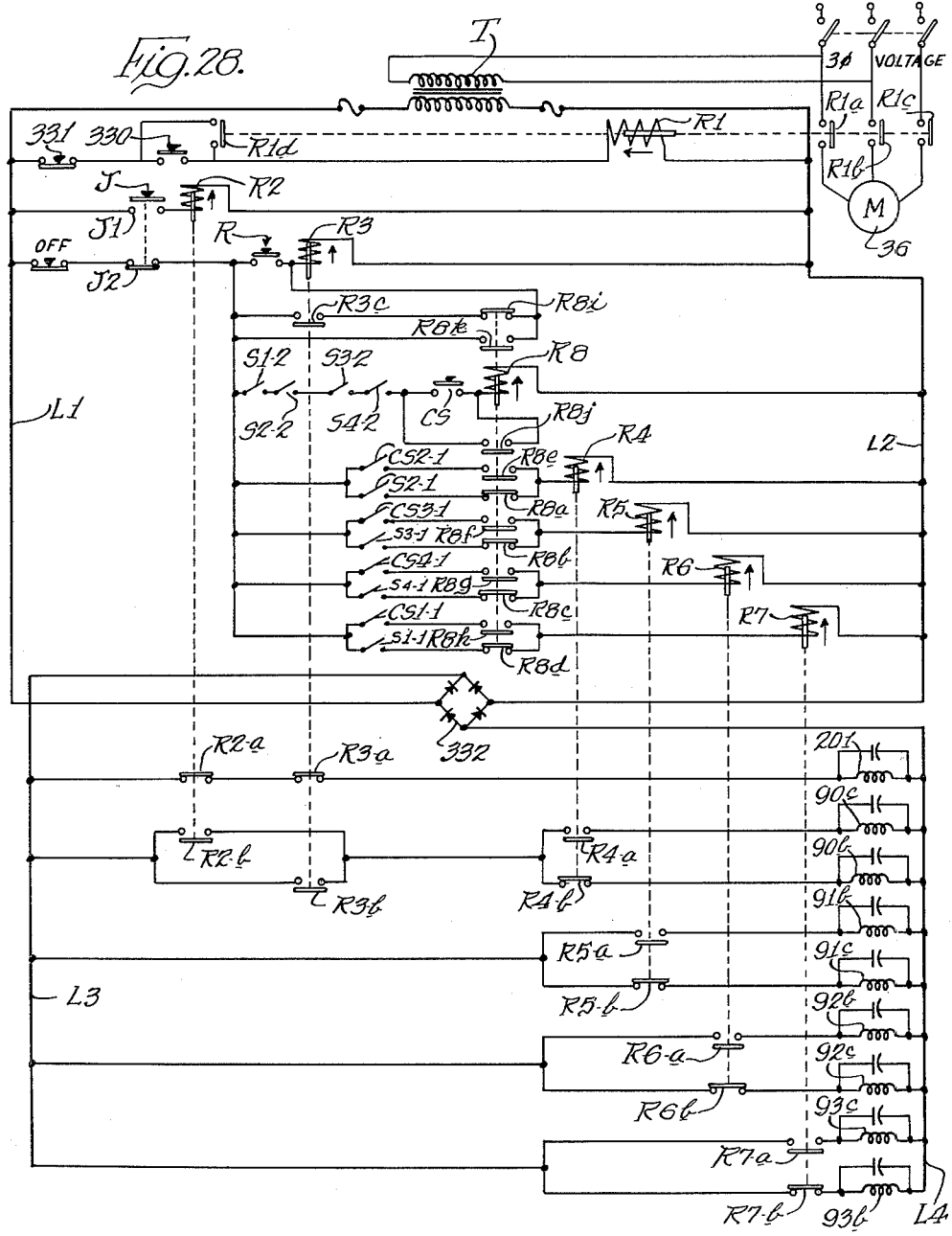

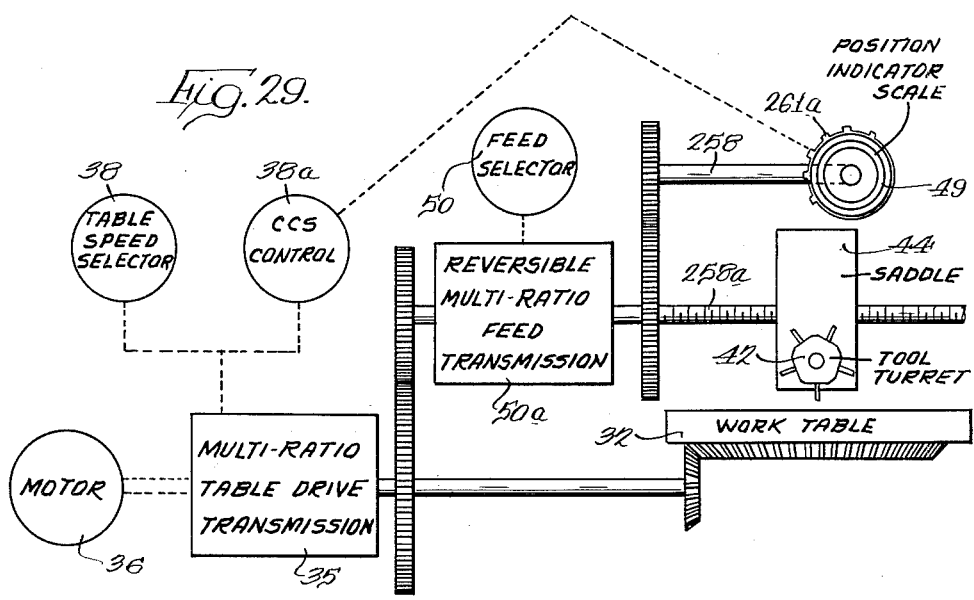

United States Patent Office 3,027,782
Patented Apr. 3, 1962

3,027,782
MACHINE TOOL TRANSMISSION AND CONTROLS THEREFOR
John C. Hollis, Fond du Lac, Wis., assignor to Giddings & Lewis Machine Tool Company, Fond du Lac, Wis., a corporation of Wisconsin
Continuation of application Ser. No. 525,469, Aug. 1, 1955. This application Aug. 31, 1960, Ser. No. 54,811
14 Claims. (Cl. 74—751)

This invention relates in general to machine tools and in particular, to multi-speed transmission and their controls for driving massive rotatable elements of machine tools.

The general aim of the invention is to provide an improved multi-speed transmission which is especially adapted to drive massive machine tool elements while permitting changes in speed to be effected by controls which require only finger tip manipulation on the part of an operator.

An important object of the invention is to create such a multi-speed transmission which may be shifted to any one of a great number of drive ratios while the parts are in motion and under load.

In this respect, it is a related object to provide such an improved multi-speed transmission which eliminates severe impact upon the driven element as a result of speed changes, yet which achieves smooth speed transition without the necessity for a fluid or flexible coupling and the disadvantageous impositive drive inherent in such coupling.

Still another object of the invention is to provide an improved arrangement for braking the massive element driven by such a multi-speed transmission. More specifically, it is intended to create an arrangement in which braking elements are located remotely from the transmission components and the exterior of the transmission housing for oil-free operation and air cooling of braking surfaces, yielding ease in adjustment or replacement of the braking elements. The arrangement further contemplates brake means which work independently of the speed change gearing to provide uniform stopping action regardless of the speed setting and even in the event that one of the speed change clutches should fail.

A further object is to create finger tip controls for a multi-speed transmission through the provision of electric control circuitry and an improved, extremely compact rotary permutation switch.

A related object is to provide transmission controls for jogging the driven element together with means for assuring that the driven element is moved at its lowest speed when jogged, regardless of the prior speed setting of the transmission.

Another object is to provide a multi-speed transmission and controls for it which yield substantially all of the advantages of constant cutting speed apparatus without requiring complex components and controls previously required to obtain those advantages.

Still another object is to provide a control arrangement in which the speed of a rotatable work support is varied in steps according to the positional zone of a tool holder feedable radially of the support.

Yet another object is to provide control means which automatically take into account the radius of a tool holder with respect to the axis of a rotatable work support, and which substantially maintain automatically any one of a plurality of cutting speeds selected in response to the setting of a dial by the operator.

Still further, it is an object of the invention to make the speed of a rotatable machine tool element controllable optionally by a manual selector, or by an automatically actuated selector actuated according to the radial zone of a tool holder to provide substantially constant cutting speed, yet in which the manual selector takes control automatically if the operator moves it.

Other objects and advantages will become apparent as the following description proceeds, taken in conjunction with the accompanying drawings, in which.

Figure 1:
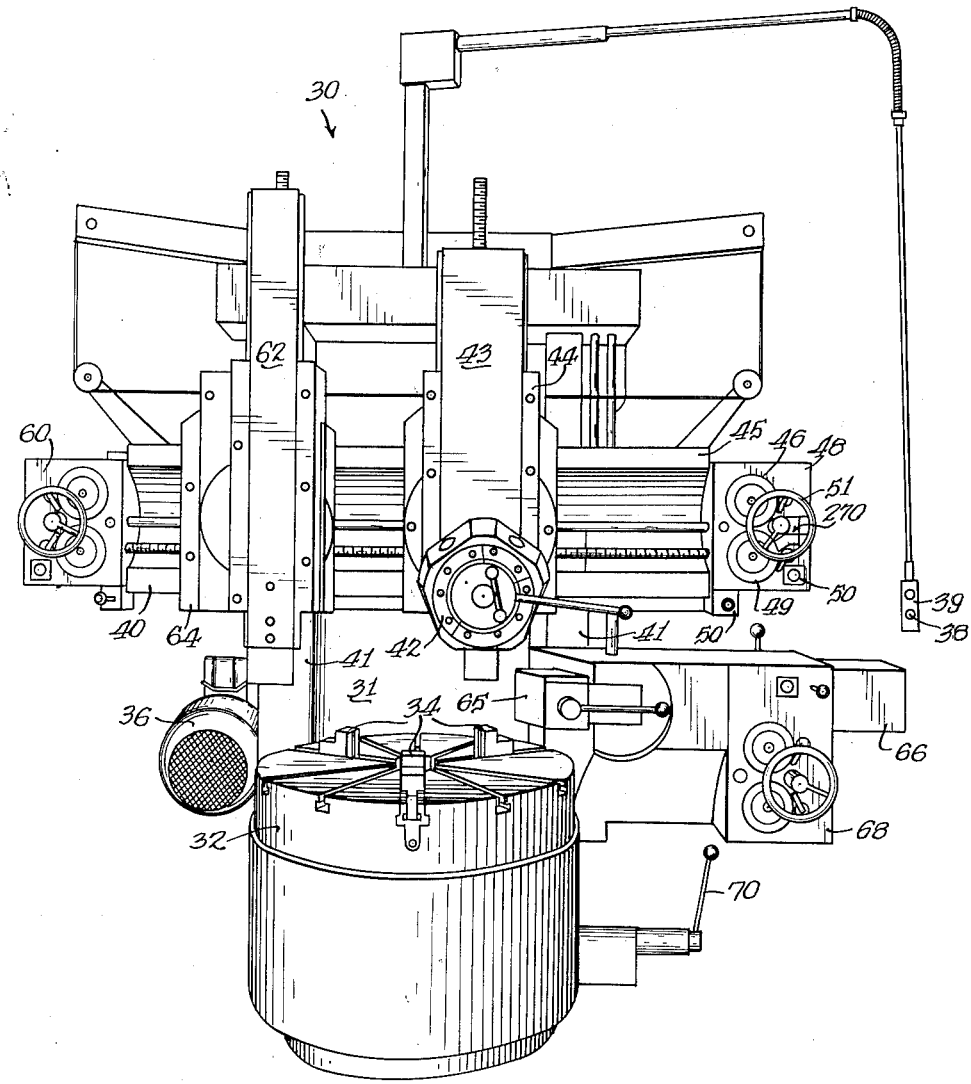
FIG. 1 is a front elevation of an exemplary machine tool having a speed change transmission and controls embodying the features of the present invention.
Figure 3:
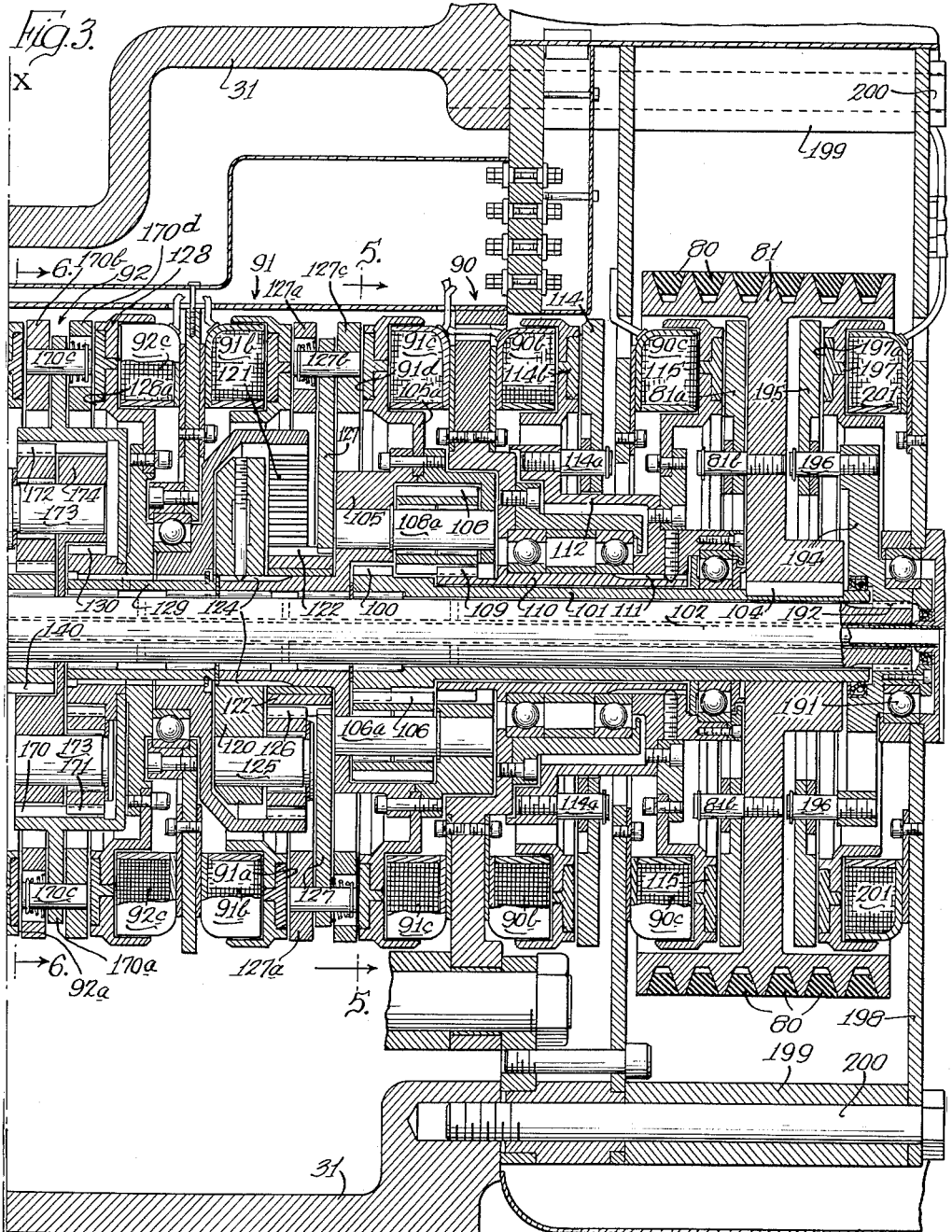
Figure 4:
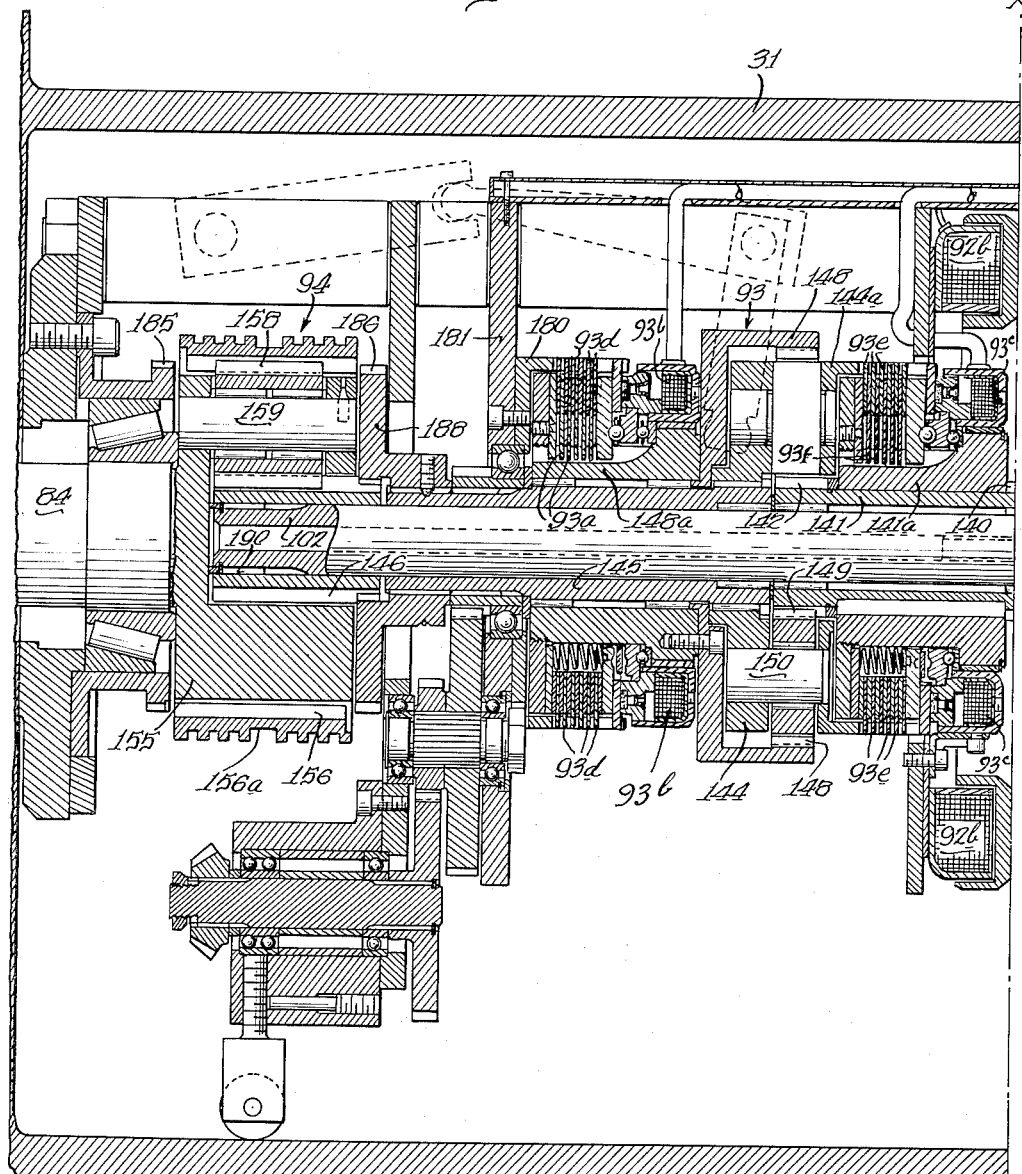
Figure 5:
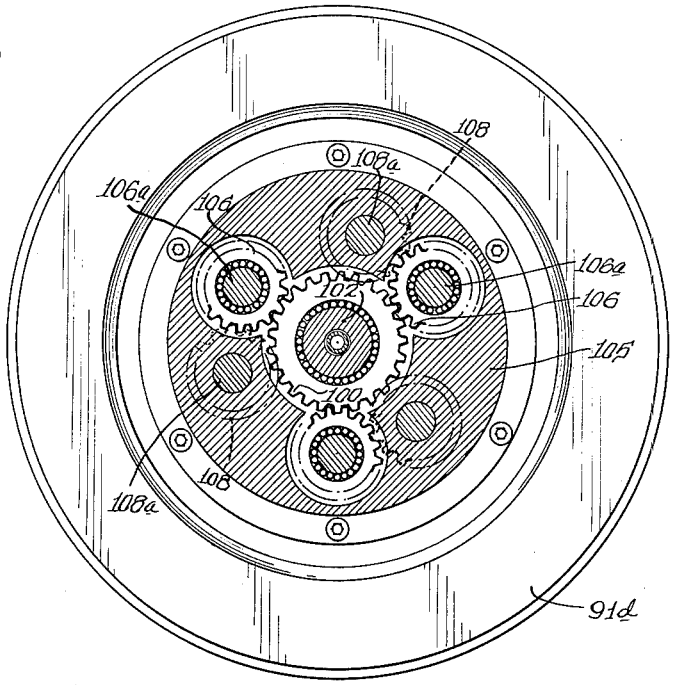
Figure 6:
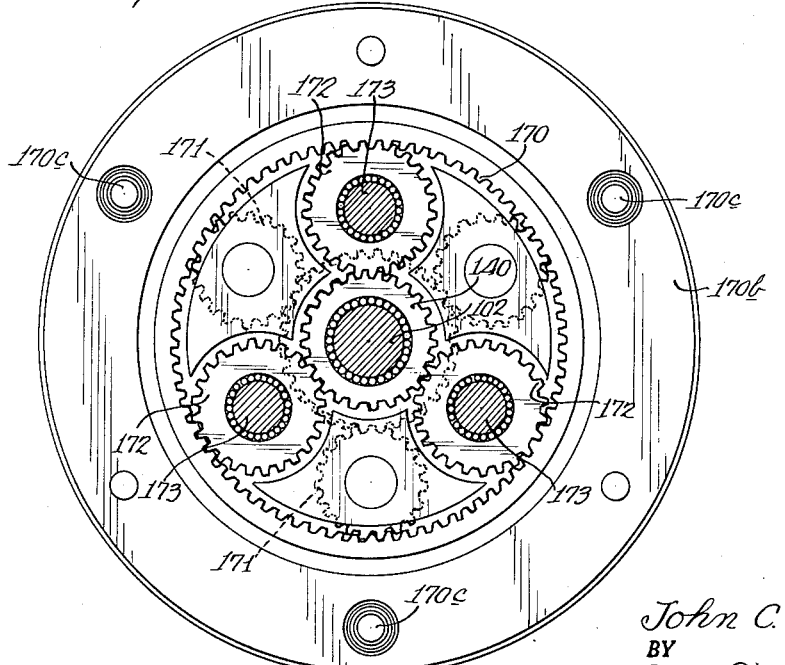
Figures 16, 17:
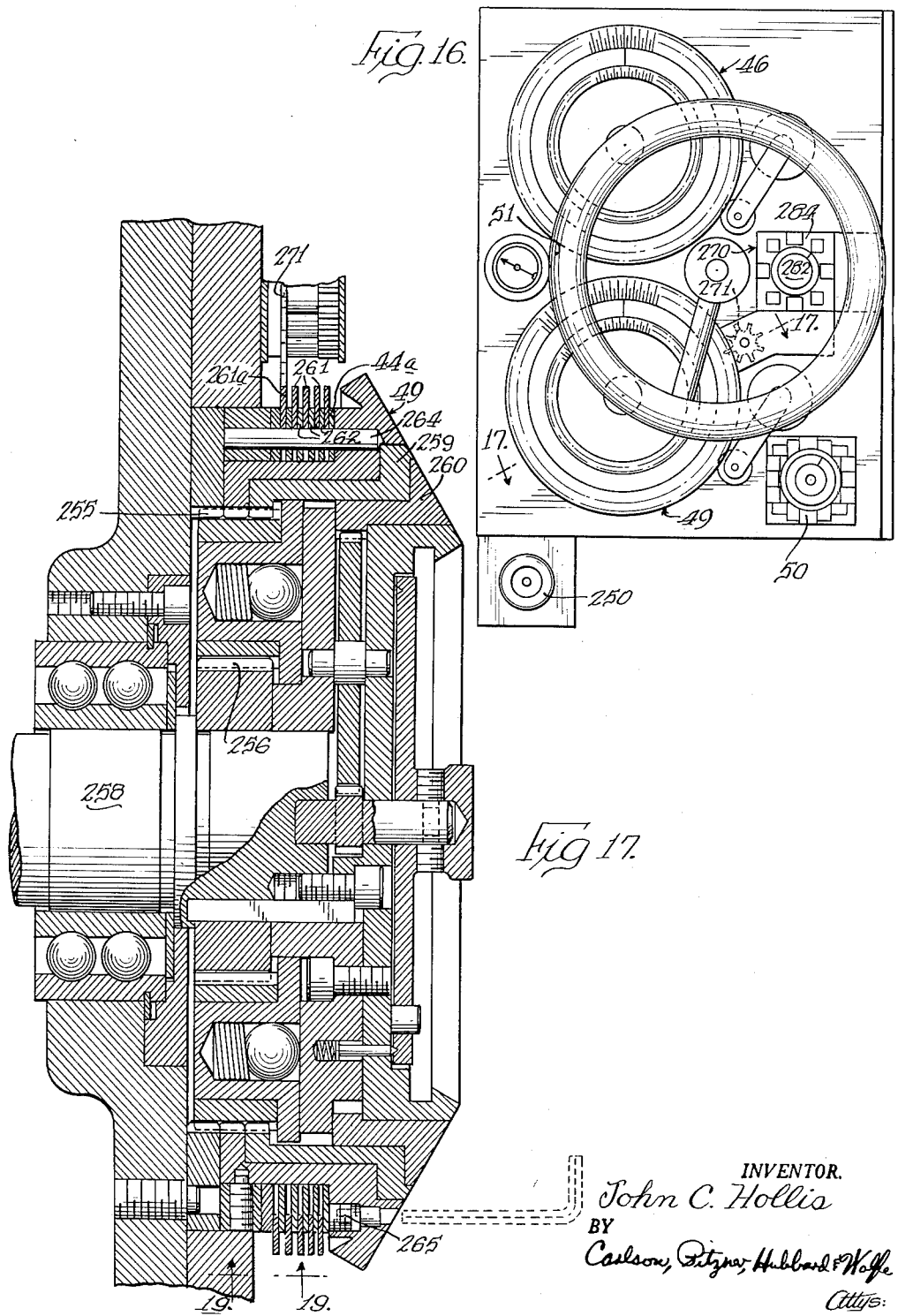
Figure 23:
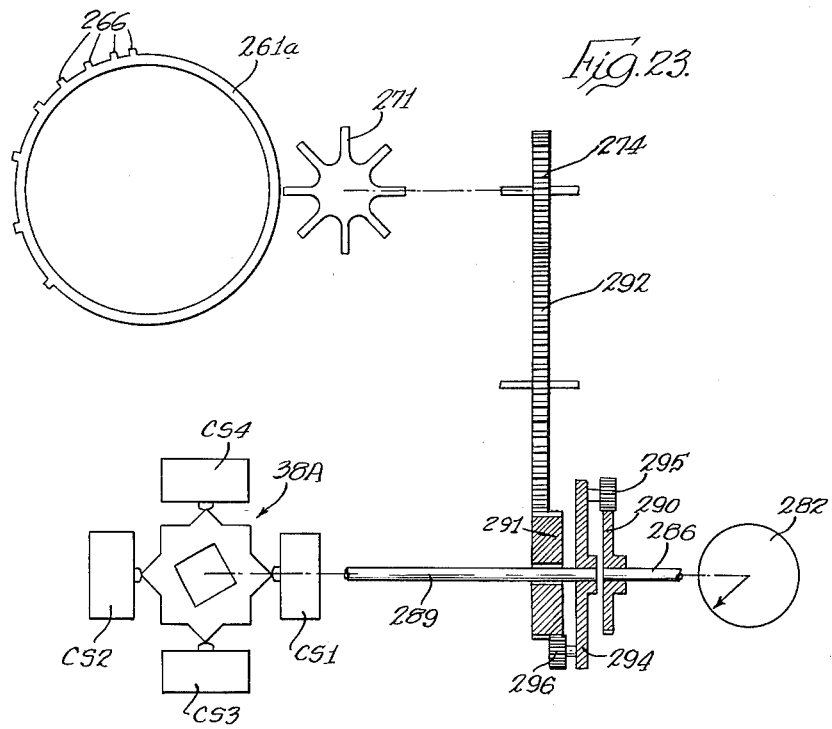
Figure 24:
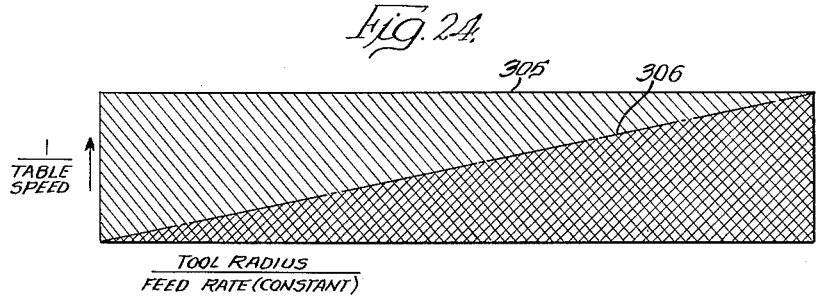
Figure 25:
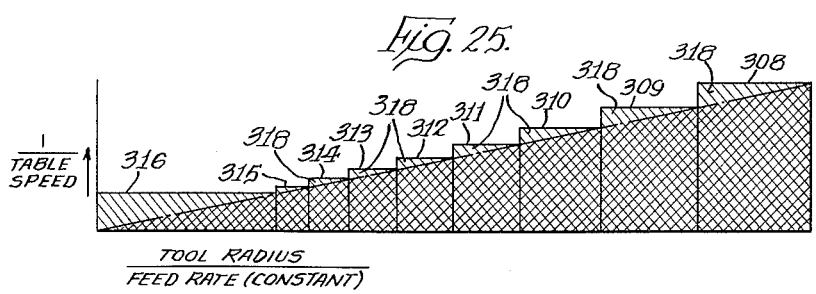
Figure 26:
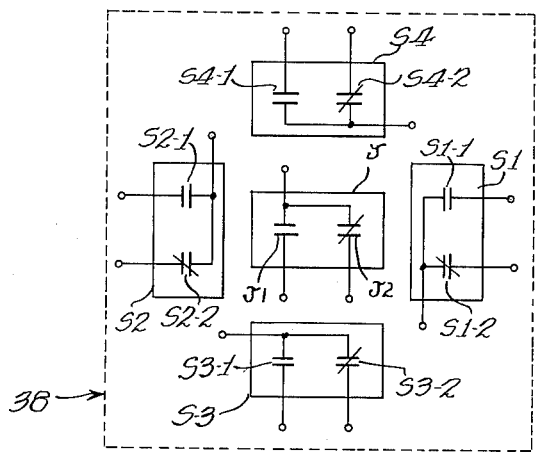
Figure 27:
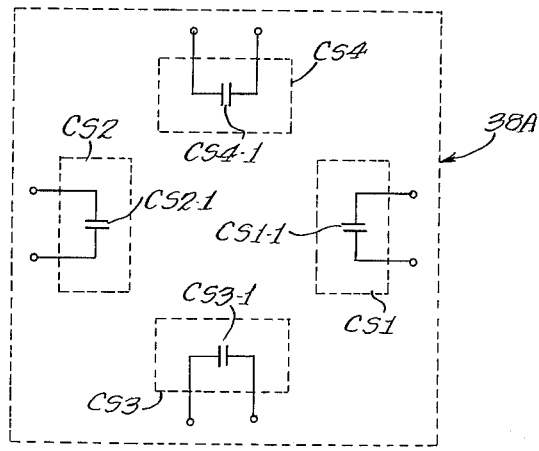

FIGS. 3 and 4, when joined along the lines X—X, are a longitudinal, vertical cross section of the multi-speed transmission employed in the machine tool;

FIGS. 5 and 6 are sectional views taken respectively along the line 5—5 and 6—6 in FIG. 3;

FIG. 7 is a diagrammatic representation of the multi-speed transmission illustrated by FIGS. 3–6;

FIG. 8 is a detail view illustrating the face of a control pendant on the machine tool shown by FIG. 1;

FIG. 9 is a detail view of a rotary selector switch shown in FIG. 8 and taken in section along the line 9—9 in FIG. 10;

FIGS. 10 and 11 are sectional views taken along the lines 10—10 and 11—11, respectively, in FIG. 9;

FIGS. 12–15 are detail views, in perspective, illustrating cams and switch trip plates associated therewith;

FIG. 16 is an enlarged front elevation of the right feed control on the machine tool illustrated in FIG. 1;

FIG. 17 is a sectional view taken substantially along the line 17—17 in FIG. 16 and illustrating particularly means for actuating cutting speed controls;

FIG. 18 is a detail view of a trip ring shown in FIG. 17 for correlating the actuation of transmission controls with the radial zone of a tool holder;

FIG. 19 is a detail view taken substantially along the line 19—19 in FIG. 17 and illustrating an adjustment scale permitting compensation for relative positions of a tool within the tool holder;

FIG. 20 is a vertical section, taken substantially along the line 20—20 in FIG. 21, illustrating the construction of a cutting speed selector and means for actuating it according to the position of a tool holder;

FIGS. 21 and 22 are detail sectional views taken substantially along the lines 21—21 and 22—22, respectively, in FIG. 20;

FIG. 23 is a diagrammatic representation of the cutting speed control illustrated in FIG. 20;

FIGS. 24 and 25 are graphs respectively, depicting the relative time efficiency for machine operations obtained with theoretically perfect constant cutting speed control and with the constant cutting speed control of the present invention;

FIGS. 26 and 27 are electrical diagrammatic representations of the manual speed selector switch illustrated by FIGS. 9–15 and the cutting speed control switch illustrated by FIGS. 20–23, respectively;

FIG. 28 is a schematic diagram of the electrical circuit employed in the transmission controls; and FIG. 29 is a diagrammatic illustration of the relationship of the multi-speed table drive, multi-speed saddle feed drive, and the saddle position indicator.

While the invention has been shown and is described in some detail with reference to a particular embodiment thereof, there is no intention that it thus be limited to such detail. On the contrary, the intention here is to cover all alterations, modifications, and equivalents falling within the spirit and scope of the invention as defined by the appended claims.

GENERAL DESCRIPTION OF THE EXEMPLARY MACHINE TOOL

Figure 2:
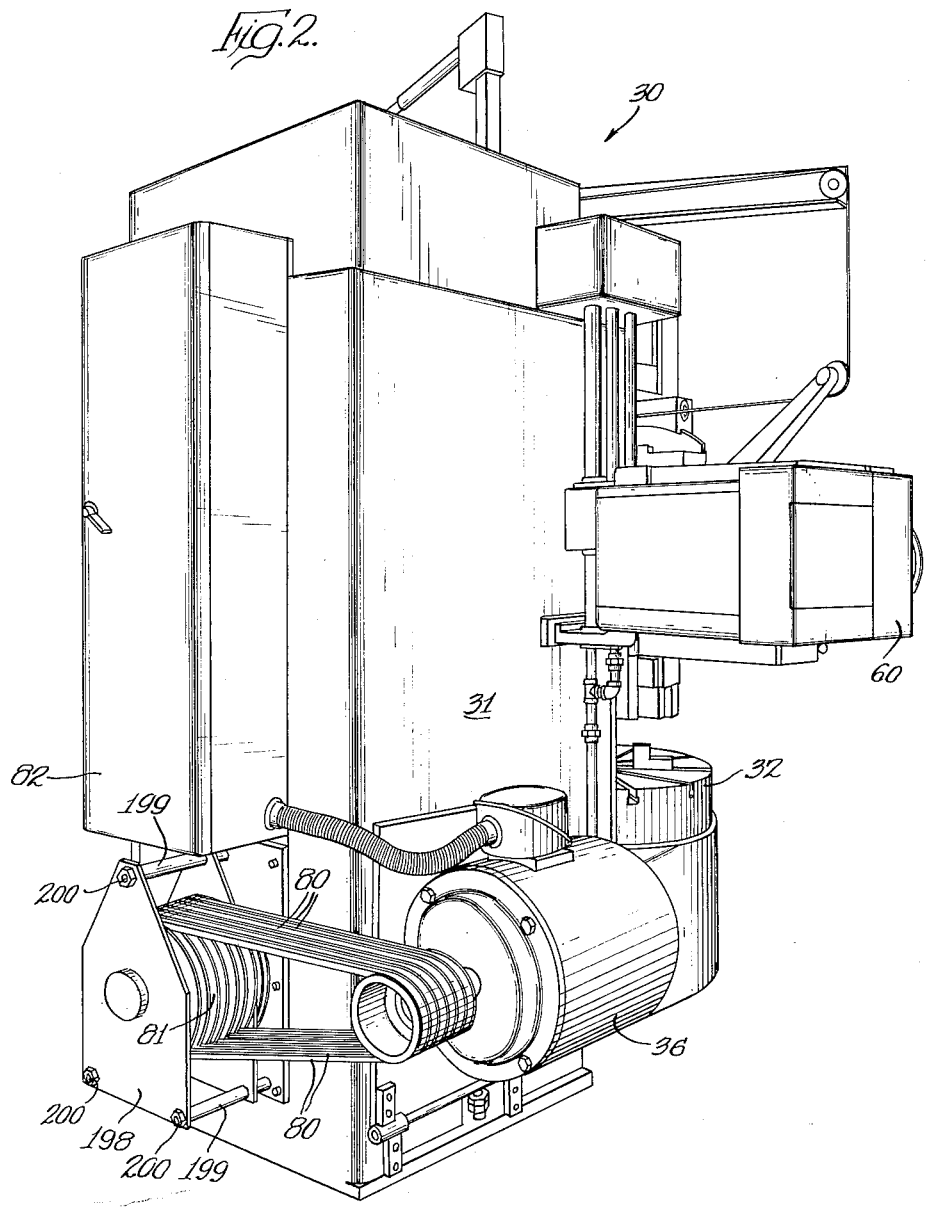
FIG. 2 is a rear perspective of the machine tool shown in FIG. 1.

To make clear the environment of the preferred embodiment of the invention, a specific machine tool to which it is applied has been shown in FIGS. 1 and 2. As there illustrated, a large vertical turret lathe 30 is provided with the improvements of the invention. The lathe itself includes a base or housing 31 extending rearwardly from a massive rotatable element or work support, in this instance, a work table 32 rotatable about a vertical axis and equipped with means such as chuck jaws 34 for holding any one of a variety of workpieces (not shown). Disposed within the housing 31 and extending in a generally fore-and-aft direction is the improved multi-speed transmission 35 (detailed in FIGS. 3–7) which drivingly connects a prime mover or main motor 36 with the table 32. The motor 36 may be of the constant speed induction type and the transmission 35 is effective to rotate the table 32 at any one of a plurality of speeds in response to the manual setting of a rotary selector 38 carried on a pendant 39.

The machine further includes a horizontal cross rail 40 which may be translated vertically along ways 41. A tool holder, here a turret 42, is fixed to a ram 43 which may be fed vertically within a saddle 44, the latter being translatable horizontal along ways 45 of the cross rail 40, and thus substantially radially of the table 32. Vertical feed of the ram 43 and its position are indicated by a scale 46 on a right head 48, while the horizontal feed or position of the saddle 44 is indicated by a scale 49. The saddle feeding movement results from take-off of power from the multi-speed transmission 35 to a feed transmission 50a and thence to a lead screw 258a (FIG. 29). Feed motion at anyone of a plurality of rates (inches per table revolution) is selected by setting a rotary feed selector 50, as explained more fully in applicant's copending application Serial No. 526,272, filed August 3, 1955, and issued as Patent 2,831,361 on April 22, 1958.

A hand wheel 51 permits manual feeding movements of the ram 43 and saddle 44.

In the present instance, the vertical turret lathe 30 is equipped with a left head 60 similar to the right head 48 and controlling the vertical feed of a second tool holding ram 62 relative to a saddle 64 which is itself horizontally translatable along the crossrail 40. Still further, the exemplary machine has a third alternative cutting tool holder 65 carried by a horizontally feedable ram 66 controlled by a head 68 which is translatable vertically along the ways 41 of the base 31.

A two-position manual lever 70 located at the right of the table permits an operator to select, as explaned below, table operation in either a "high" or "low" speed range.

THE MULTI-SPEED TRANSMISSION

As shown best in FIG. 2, the main driving motor 36 is connected with the input end of the multi-speed transmission 35 by a plurality of V belts 80 running over a relatively large sheave 81 which is disposed outside the rear wall of the main housing or casting 31. A removable belt guard may be employed to cover the V belts 80, but it permits free circulation of air around the sheave. Immediately above the sheave, as shown in FIG. 2 is located a control box 82 which may house the various relays and control components to be described later. With reference to FIG. 7, the multi-speed transmission 35 terminates in an output member or shaft 84 which carries a bevel gear 85 meshing with a ring gear 86 on the underside of the table 32 so that the latter is rotated about a vertical axis.

Connected between the sheave 81 as an input member and the shaft 84 as an output member are a plurality of planetary speed change gear sets 90, 91, 92 and 93 (FIGS. 3, 4 and 7) together with a fifth planetary gear set 94 which is controlled by the manual lever 70 (FIG. 1) to give high and low speed ranges. Each of these planetary gear sets 90–94 operates at either of two speed change ratios and, together, they make up the entire multi-speed transmission 35. With the manually controlled gear set 94 in the "low" range, the other four gear sets 90–93 thus make possible sixteen different speed change ratios, assuming that the main motor 36 operates at constant speed. Shifting the gear set 94 to the "high" position permits sixteen additional table speeds, for a total of 32.

Referring more particularly to FIGS. 3–7 the first planetary speed change gear set 90 is made up of a first terminal or input member formed as an integral sun gear 100 on the inner end of a sleeve shaft 101 which rotatably surrounds a brake shaft 102 (to be described) and which is keyed as at 104 to the sheave 81. The terminal output member of the gear set 90 is a planet carrier 105 which journals on studs 106a, a first plurality of planet gears 106 meshing with the sun gear 100 and, in turn, meshing with a second set of overlapping planet gears 108 journaled on studs 108a fixed to the carrier 105. An intermediate or reaction member of the first gear set 90 is constituted by a gear 109 meshing with the planet gears 108 at their inner sides. The reaction gear 109 is integral with a sleeve 110 rotatable on the sleeve 101 and keyed as at 111 to a collar 112 having radially extending flanges 114, 115. If the collar 112 is held stationary by locking it to the housing 31, rotation of the input sun gear 100 makes the planet gears 106, 108 roll around the reaction gear 109, so that the output terminal member or planet carrier 105 rotates in the same direction as the input sun gear but at a reduced speed ratio. By way of example, the diameters of the several gears employed may be selected to result in a speed reduction ratio of 2:1. On the other hand, if the collar 112 and the reaction gear 109 are locked fast to the input member or sun gear 100 (i.e., locked to the sheave 81), the planet gears 106, 108 cannot rotate about their own axes and direct drive with a 1:1 ratio between the sheave 81 and the planet carrier 105 is obtained.

The second planetary gear set 91 also comprises an input terminal member, an output terminal member, and an intermediate or reaction member, shown, respectively, as a planet carrier 120, a ring gear 121, and a sun gear 122. The input terminal member or carrier 120 is keyed fast at 124 to a sleeve extension of the planet carrier 105 so that the gear sets 90 and 91 are connected in tandem relation. The carrier 120 supports a plurality of studs 125 journaling a like plurality of planet gears 126 which mesh at their outer sides with the ring gear 121 and at their inner sides with the reaction sun gear 122. From FIGS. 3 and 7 it will be seen that the reaction sun gear 122 is provided with a radial flange 127, and that the output ring gear 121 carries bolted thereto a radial flange 128 as well as a rotatable sleeve 129 formed with an integral sun gear 130 constituting the input terminal member for the next tandemly connected planetary gear set 92.

When the reaction sun gear 122 and its radial flange 127 are held stationary with the housing 31, and the planet carrier 120 is rotationally driven, the planet gears 126 must rotate about their studs 125 and roll around the sun gear so as to drive the ring gear 121 at an increased speed. The diameters of the several gears may, for example, be chosen so that the output ring gear 121 turns 1.4 times faster than the input planet carrier 120, and in the same direction. On the other hand, if the reaction sun gear 122 and its radial flange 127 are held fast to the input terminal member or carrier 120 (i.e., to the planet carrier 105), then the planet gears 126 cannot rotate and direct drive with a 1:1 ratio is obtained between the input terminal member 120 and the output terminal member 121.

Deferring a detailed description of the third planetary gear set 92 for the moment, it may be observed that this gear set has in addition to the input terminal member formed by the sun gear 130, an output terminal member formed by a second sun gear 140. The latter is made integral with or keyed to a hollow sleeve 141 (FIG. 4) which at its opposite end carries an input terminal member or sun gear 142 for the fourth planetary gear set 93. This fourth gear set includes as its output terminal member a planet carrier 144 having keyed to it a hollow sleeve 145 extending axially to the left and, in turn, keyed to a sun gear 146 forming the input terminal member of the next tandemly connected planetary gear set 94. Finally, the fourth gear set 93 employs a reaction member or ring gear 148 which meshes with the peripheries of a plurality of planet gears 149 journaled on studs 150 supported by the planet carrier 144. The planet gears 149 also mesh with the input sun gear 142.

If the reaction ring gear is held stationary with the housing 31, rotation of the input sun gear 142 forces the planet gears 149 to rotate about their studs 150, thereby driving the output planet carrier 144 in the same direction but with a reduced speed ratio. By way of example, the diameters of the several gears may be chosen to make this speed reduction ratio in the order of 4:1. However, if the planet carrier 144 is held rigid with the input sun gear 142, then the planet gears 149 cannot rotate about their own axes and a direct drive with 1:1 ratio results.

As noted above, the sun gear 146 which is rotationally rigid with the planet carrier 144 forms the input terminal member for the fifth speed change gear set 94. This gear set also includes an output terminal member constituted by a planet carrier 155 which is integral with the output shaft 84. An intermediate member or internal ring gear 156 meshes at the outer peripheries of a plurality of planet gears 158 journaled on studs 159 supported by the planet carrier 155. These planet gears also mesh at their inner sides with the sun gear 146.

With this arrangement, therefore, if the reaction ring gear 156 is held stationary with the housing 31, the planet gears 158 must roll around the ring gear 156 and sun gear 146 so that the planet carrier 155 turns at a reduced speed relative to that of the input sun gear 146. In an exemplary installation, the relative diameters of the several gears may be chosen such that this speed reduction ratio is in the order of 4:1. On the other hand, if the ring gear 156 is held rigid with the input sun gear 146, i.e., locked to the sleeve 145, then the planet gears 158 cannot rotate about their axes and a direct 1:1 drive ratio between the sun gear 146 and the planet carrier 145 results.

*Impact Minimization*

From the foregoing, it will be apparent that by locking the reaction member of each gear set either to the housing or to one of the terminal members in different combinations, a total of sixteen speeds may be obtained for each setting of the fifth gear set 94. The gear set 92, to be described in detail below, produces a speed ratio change in a manner similar to that of the other gear sets, but it is constructed in a particular manner to minimize the impact or jolt which would otherwise be given to the massive work table by a transition in one or more of the gear sets while operating under load.

In planetary transmissions of the type here considered it has in the past been deemed necessary to include in the drive path a flexible or fluid coupling which absorbs the impact created by clutching or braking of rotating parts while the driven element was in motion. Such a fluid coupling renders the drive impositive and totally unsatisfactory for application to machine tools where the speed of a rotatable work support must be accurately controlled for thread cutting and certain other operations. Prior arrangements without a flexible coupling resulted not only in shocks on the driven element, but also placed tremendous loads on the prime mover when the various clutches were shifted to create an increase in table speed. This dictated the use of a motor having a much higher horse power rating than that which would be required under steady state operation.

In accordance with an important feature of the invention, these difficulties are eliminated and a smoothly shiftable tandem planetary speed change transmission achieved, without the use of a fluid coupling, by constructing one of the planetary gear sets in a manner such that its reaction member tends to rotate at a high speed while being shifted from the housing to a terminal element, thereby storing kinetic energy which is, in part, returned to the transmission as the speed transition is completed. Moreover, the controls are arranged such that this particular kinetic energy storing planetary gear set is shifted each time that a speed change is made.

Referring in more detail to FIGS. 3, 6 and 7, the planetary gear set 92 which performs this energy storing function has the sun gears 130 and 140 as its input and output terminal elements, respectively. This gear set further includes an intermediate member 170 formed as a relatively long internal ring gear which meshes around the outer peripheries of two sets of planetary gears 171 and 172, respectively. The latter gears are journaled on axial studs 173 carried by a freely rotatable planetary carrier 174. It will be noted from FIG. 3 that the reaction ring gear 170 has an integral radial flange 170a which, as explained below, may be held stationary with the housing or rotationally rigid with the input sun gear 130 or, for the same effect, the preceding output ring gear 121.

With the arrangement shown, the input sun gear 130 is larger in diameter than the output sun gear 140 and the planetary gears 171 are smaller in diameter than the planet gears 172. With the reaction ring gear 170 held fast to the housing, the gear set 92 behaves as a pair of gear sets connected in tandem, one providing a speed step-down and the other providing a speed step-up. The planet gears 171 in rotating about their respective axes as the input sun gear is driven, cause the common planet carrier 174 to rotate at a lower speed than that of the input sun gear. The carrier 174 in bodily rotating the planet gears 172 causes them to roll around the internal teeth of the ring gear 170 so that the output sun gear is driven at a greater speed than the planet carrier itself.

In the present instance, the relative diameters of the several gears are so chosen that the net speed change or step up, between the input sun gear 130 and the output sun gear 140, with the ring gear 170 held stationary, is in the order of 1.2:1.

On the other hand, if the ring gear 170 and its flange 170a is locked to the input sun gear 130, then the planetary gears 171 and 172 cannot rotate, and the two sun gears 130, 140 are driven in unison with a one-to-one ratio.

During the transition period when the ring gear 170 is being shifted from the housing to a part rigid with the input sun gear, that ring gear is free to rotate. And by virtue of the two planet gear groups 171, 172 and a "floating" planet carrier 174, the ring gear 170 tends to rotate in the same direction as the input sun gear 130 if the latter speeds up faster than the sun gear 140 but in the opposite direction if the sun gear 130 lags the sun gear 140. The ring gear 170 thus rotates in opposite directions when the speed change is an increase or a decrease, respectively. Moreover, the relative diameters of the gears cause the ring gear 170 to attempt to rotate at a speed about six times the difference in the speeds of the two sun gears 130 and 140. The kinetic energy put into the ring gear is thus fairly great, but proportional to the difference in speed between the motor 36 and the table 32.

As the ring gear 170 thus tends to rotate rapidly during the time that it is free, it stores a large amount of kinetic energy, especially in view of its relatively large diameter and its radially extending flange 170a. Thus, the prime mover or motor 36 is temporarily loaded and its energy stored in the rotating ring gear 170 even though it is momentarily disconnected from the table 32. The motor cannot accelerate rapidly only to be abruptly loaded again. A heavy impact, which would abruptly load the motor is prevented as the ring gear 170 is re-locked since its energy is in part returned to the high inertia work table, aiding in accelerating the same.

The result is a smooth "impulse," as opposed to an abrupt impact, imparted to the relatively light ring gear 170 which can, owing to its smaller inertia, speed up quickly to store energy in kinetic form. Then, as the ring gear 170 is re-locked, by friction means described, its energy is in part dissipated as heat and the remainder is smoothly transferred through the succeeding gear sets 93, 94 to the table 32. The total effect of this arrangement is such that the massive table 32 may be given changes in speed without heavy impacts on the gearing and without employing any type of fluid coupling.

As an important aspect of the invention, the energy storing gear set 92 is shifted each time the table speed is changed, as explained more fully below. Whenever any of the other gear sets is shifted, the gear set 92 is also shifted so that the smoothing energy storage action occurs.

Electric Brakes and Clutches

For selectively holding the reaction members of each gear set either stationary with the housing 31 or rotationally rigid with one of their corresponding terminal members, electro-magnetic brakes and clutches are preferably employed. As shown in FIGS. 3, 4 and 7, the reaction gear 109 of the gear set 90 may be held stationary with the housing 31 by energizing a brake coil 90b which magnetically attracts the flange 114, slidable on pins 114a carried by the collar 112, against a coil shoe 114b mounted rigidly in the housing 31. This as explained, causes the first gear set 90 to produce a speed reduction of 2:1 between the sheave 81 and the terminal member or planet carrier 105. Alternatively, a clutch coil 90c may be energized to magnetically attract an armature 81a, slidable on pins 81b carried by the sheave 81, against a friction surface on the flange 115 which, in turn, is bolted to the collar 112. This, of course, results in a direct or one-to-one drive through the first gear set. The flange 115 has a recess into which the coil 90c extends, but the coil is stationary while the flange rotates.

In a similar manner, the reaction gear 122 may be held stationary by energizing a brake coil 91b which attracts an armature 127a, carried by pins 127b in the flange 127, against a friction surface 91a on a shoe mounted rigidly in the housing 31. This produces the 1.4:1 speed step-up between the input planet carrier 120 and the output ring gear 121. Alternatively, the brake 91b may be de-energized and a clutch coil 91c energized to attract a second armature 127c (also carried on the pins 127b) against a friction surface 91d on a ring 105a which is bolted fast to the ring gear 105 and rotated in closely spaced relation to the coil 91c. The energization of the clutch coil 91c thus locks the reaction gear 122 to the input member 120 and produces a direct drive through the second gear set 91.

An electric brake coil 92b, and an electric clutch coil 92c are likewise employed to hold the reaction ring gear 170 of the gear set 92 either stationary or rotationally rigid with the input sun gear 130 which, in turn, is rotationally rigid with the ring gear 121. As shown in FIGS. 3 and 4, energization of the brake coil 92b attracts an armature 170b carried on pins 170c in the flange 170a against a friction surface 92a of a shoe which surrounds coil 92b and is mounted fast in the housing 31. Conversely, energization of the coil 92c attracts an armature 170d against a friction surface 128a on the flange 128 bolted fast to a radial projection from the axial sleeve 129 which is rotationally rigid with the ring gear 121.

For locking the reaction ring gear 148 of the gear set 93 stationary with the housing 31, a multiple disc electro-magnetic clutch is employed having a brake coil 93b and a set of interleaved friction discs 93a, 93d which are carried respectively by an axial sleeve 148a fixed to the ring gear 148, and a surrounding collar 180 bolted fast to a partition 181 in the housing 31. This, as explained, produces a speed reduction ratio of 4:1 between the input sun gear 142 and the output planet carrier 144. For locking the gear set 93 so that it produces direct drive, a multiple disc electro-magnetic clutch is employed which includes a clutch coil 93c and a plurality of interleaved clutch discs 93e, 93f. The discs 93e are rotationally fast, yet accurately shiftable, in a ring 144a rigid with the planet carrier 144, while the discs 93f are similarly mounted in a sleeve 141a fast on the sleeve 141, which in turn is connected to the input sun gear 142.

The fifth gear set 94 is shifted to produce either of its two speed change ratios by manipulation of the lever 70 (FIG. 1). An appropriate linkage is made between that lever and a shifter yoke (not shown) engaged in a circumferential slot 156a of the ring gear 156. Shifting of the ring gear 156 to the left (FIG. 4) causes its inner teeth to lock with mating clutch teeth 185 on the collar bolted fast in the housing 31, these causing the gear set 94 to provide, in the present instance, a 4:1 speed reduction between its input sun gear 146 and its output carrier 155. On the other hand, the ring gear 156 may be shifted axially to the right so that its internal teeth clutch with mating teeth 186 on a clutch flange 188 locked rigidly on the shaft 145 which turns with the input sun gear 146. This produces direct drive through the gear set 94.

While it is possible to vary the specific speed change ratios provided by a particular transmission constructed in accordance with the invention, the following table gives exemplary table speeds obtained by energizing the several brake coils and clutch coils in various combinations, assuming that the main motor 36 operates at a constant speed of about 1725 revolutions per minute.

| Pattern Number | Brake and Clutch Pattern; x=energized, o=deenergized | | | | | | | | Table Speed— r.p.m. | |
|---|---|---|---|---|---|---|---|---|---|---|
| | 92b | 92c | 91b | 91c | 90c | 90b | 93c | 93b | High Range 1:1 in set 94 | Low Range 4:1 in set 94 |
| 1 | o | x | o | x | o | x | o | x | 24 | 6.0 |
| 2 | x | o | o | x | o | x | o | x | 28 | 7.0 |
| 3 | o | x | x | o | o | x | o | x | 34 | 8.4 |
| 4 | x | o | x | o | o | x | o | x | 40 | 10 |
| 5 | o | x | o | x | x | o | o | x | 48 | 12 |
| 6 | x | o | o | x | x | o | o | x | 56 | 14 |
| 7 | o | x | x | o | x | o | o | x | 68 | 17 |
| 8 | x | o | x | o | x | o | o | x | 80 | 20 |
| 9 | o | x | o | x | o | x | x | o | 96 | 24 |
| 10 | x | o | o | x | o | x | x | o | 112 | 28 |
| 11 | o | x | x | o | o | x | x | o | 136 | 34 |
| 12 | x | o | x | o | o | x | x | o | 160 | 40 |
| 13 | o | x | o | x | x | o | x | o | 192 | 48 |
| 14 | x | o | o | x | x | o | x | o | 224 | 56 |
| 15 | o | x | x | o | x | o | x | o | 272 | 68 |
| 16 | x | o | x | o | x | o | x | o | 320 | 80 |

The Braking Arrangement

As shown best by FIGS. 3 and 4, the table 32 is braked, when it is to be stopped, by an electro-magnetic brake which is located externally of the housing 31 and exposed at the rear of the latter. For this purpose, each of the axially alined, tandemly connected gear sets 90–94 is formed with a central axial passage therethrough, defined by the inner surfaces of the hollow shafts 101, 141, and 145. The brake shaft 102 extends through these passages and lies on the axis which is common to all of the gear sets. At its forward end, this brake shaft is keyed as at 190 to the sun gear 146 of the fifth planet gear set 94. At its rear end, the brake shaft 102 is journaled in bearings 191 and is keyed as at 192 to a radial flange 194 which supports an armature 195 axially shiftable on pins 196. The main brake includes a stationary shoe 197 locked to a plate 198 which is supported by spacers 199 and bolts 200 from the rear surface of the housing 31. The stationary brake shoe 197 nestingly receives an electro-magnetic brake coil 201 and has a friction surface 197a against which the armature 195 is attracted when the coil 201 is energized.

During braking, at least one of the reaction members in the multi-speed transmission is left in "neutral" by having both its clutch coil and its brake coil de-energized. At the same time, the brake coil 201 is energized to frictionally lock the armature 195 and the flange 194 against rotation, so that the brake shaft 102 exerts a retarding torque on the sun gear 146 at the front of the transmission, thus braking the table 131 through only the fifth gear set 94.

Several important advantages accrue from this braking arrangement. First, the brake components such as the coil 201 the stationary shoe 197, and the rotatable armature 195 are all located externally of the housing 31 where they are free of lubricant which is supplied to the gears of the multi-speed transmission. Operation of frictional braking surfaces "dry" permits them to have a much greater torque capacity for a given size and area. Secondly, these brake components are readily cooled by air convection since any protective belt guard may be sufficiently open to permit good air circulation, in contrast to the relatively air-tight housing 31 which must be sealed against oil leakage. Moreover, these brake parts are readily accessible for adjustment, repair, or replacement. And when the brake acts, it completely by-passes the gearing in the first four gear sets 90–93, eliminating a "wind-up" and positively braking the table even if one of the several electro-magnetic clutches or brakes employed in those gear sets should fail. An additional advantage lies in the fact that the main brake always produces the same action in stopping the table. If the brake acted through the transmission components it would retard the table more abruptly when the transmission were set to produce a low speed and thus operated with a high mechanical advantage. If the brake were sufficiently large to stop the table in the desired minimum time when the transmission was set for a high table speed (low mechanical advantage), then it would be over-sized when the transmission was set for a low speed, stopping the table with a severe jolt. That difficulty is eliminated with the present compact arrangement.

TABLE SPEED SELECTOR

As previously indicated, the main motor 36, in the interest of economy, may be of the induction type which runs at substantially constant speed. By energizing the various brake coils 90b–93b and clutch coils 90c–93c in different combinations, sixteen speeds for the table 32 may be obtained in both the "high" and "low" ranges.

In accordance with one feature of the invention, the controls for obtaining such a plurality of speeds includes a novel permutation switch assembly for speed selection which is extremely small and compact and which may be easily set to any position by finger-tip adjustment. To achieve such compactness, a plurality of miniature, pressure-sensitive switches of the type commercially available under the trade names "Micro-Switch" and "Switchette" are mounted with their actuators in a common plane, angularly spaced about a rotatable shaft carrying a plurality of radial cams spaced axially thereon. The cams have a progressively increasing number of radial transitions increasing by powers of two, and each is engaged by a follower tab staggered axially on a different one of a plurality of pivoted trip plates, each of which has operative engagement with the actuator of a corresponding one of the switches.

Referring in more detail to FIGS. 8–15, the manual speed selector 38 (mounted in the pendant 39) is made as a permutation switch assembly which comprises a frame made up of front and rear apertured plates 210, 211 which are held together by a plurality of fasteners 212. A shaft 214 is extended through the frame plates and rotatably journaled therein, having a square cross-sectional portion 214a disposed between the plates. A suitable face plate 215 may be fixed to the frame plate 210 and marked with numerical indicia indicating the table speeds as shown in FIG. 8 according to the rotational position of a mark on a hand knob 216 locked by a set screw 218 on the shaft and used to index the latter.

A plurality of switches S1, S2, S3, and S4 are disposed between plates 210, 211 in angularly spaced relation about the shaft 214. The fasteners 212 which hold the plates 210, 211 together may be passed directly through mounting holes in the switch bodies, the latter thus serving to space the plates apart. The several switches, therefore, are disposed in substantially the same plane and present their respective yieldable actuators S1a, S2a, S3a, and S4a angularly spaced about the shaft and extending radially inward toward the latter. Each of the switches contains normally open and normally closed contacts which are reversed when their respective actuators are depressed, as explained more fully below.

To produce every possible combination of switch actuation, a plurality of cams C1, C2, C3, and C4, are mounted in axially spaced relation on the square portion 214a of the shaft 214. The cams have center apertures 220 matching the cross-section of the shaft portion 214a so that they must rotate with the latter. It will be observed from FIGS. 12–15 that the cam C1 is formed with two radial transition points 221, 222 between relatively large and small radius peripheral portions, these transition points being spaced 180° apart. The second cam C2 has four such radial transition points 224–227 between four peripheral portions two of which are of relatively large radius and two of which are relatively small in radius, all subtending approximately 90°. The third cam C3 has eight radial transition points 228 spaced at 45° angles and joining eight peripheral portions of alternately large and small radius. Finally, cam C4 has sixteen radial transition points 229 spaced apart 22½° and separating sixteen peripheral portions of alternately large and small radius. The cams are "phased" on the shaft portion 214a so that a large radius portion of each lies at the same angle.

For operatively associating each of the cams with a corresponding one of the switches, a plurality of trip plates 230, 231 232 and 233 are pivotally mounted on a corresponding plurality of collared screws 234 which may also serve to mount a fifth switch J as explained below. Each of the trip plates extends from its pivot mounting to overlie a corresponding one of the switch actuators S1a–S4a, the plate being substantially equal in axial length to the space taken by the several cams C1–C4. To make each trip plate responsive only to a corresponding one of the cams, the plates are each provided with an inturned follower tab 230a–233a, respectively. The follower tabs are progressively spaced axially along the shaft (compare FIGS. 12–15) so that the tab 230a rides on the cam C1 and causes the trip plate 230 to actuate the switch S1, the tab 232a rides along the cam C2 and causes the trip plate 232 to actuate the switch S2, the tab 231a rides along the cam C3 and causes the trip plate 231 to actuate the switch S3, and the tab 233a rides on the cam C4 causing the trip plate 233 to actuate the switch S4.

The face plate 215 carries indicia at sixteen angularly spaced positions (FIG. 8). To hold the shaft 214 and the several cams at any one of these positions, after they are set by manually adjusting the knob 216, the cams C1–C4 are provided with small axial holes 235 which are alined after the cams are assembled on the shaft. A compression spring 236 disposed within the passageway formed by these alined holes (FIG. 11) urges a pair of detent balls 238 outwardly into yieldable engagement with corresponding ones of a plurality of sixteen angularly spaced detent holes 239 drilled in the front and rear frame plates 210, 211.

To afford utmost convenience to "jogging" controls, the shaft 214 is made hollow with a central passageway 214b therethrough. A plunger 242 is axially slidable in the passageway 214b as a push button 244 in the center of the knob 215 is depressed. The plunger 242 is operatively connected to depress the actuator 245a of a fifth miniature switch J mounted by a suitable bracket to the rear of the frame plate 211. The switch J, when intermittently actuated causes the table 32 to jog, as described more fully below.

From the foregoing, it will be seen that the switch S4 is actuated or released each time that the knob 216 and the shaft 214 are indexed from one position to the next. That is, the switch S4 is actuated in the eight alternate positions of the sixteen possible positions for the knob 216. Since the cam C3 has eight radial transition points 228 and correspondingly only four peripheral portions of relatively great radius, the switch S3 is actuated or deactuated each time that the shaft 214 is indexed through two successive rotational positions. That is, the switch S3 is actuated when the shaft is in every other pair of its sixteen successive positions. Similarly, because the cam C2 has only two peripheral portions of relatively great radius, the switch S2 is actuated when the shaft is in alternate groups of four of the possible sixteen positions. Finally, the switch S1 is actuated when the shaft 214 is in eight of the sixteen possible positions.

It is clear, therefore, that the conditions of the switches will change in a permutated pattern as illustrated by the following table:

| Angular Position of Knob 216 | Speed Indication, High/Low | Switch Condition: x=Actuated, o=Deactuated | | | |
|---|---|---|---|---|---|
| | | S1 | S2 | S3 | S4 |
| 1 | 24/6 | o | o | o | o |
| 2 | 28/7 | o | o | o | x |
| 3 | 34/8.4 | o | o | x | o |
| 4 | 40/10 | o | o | x | x |
| 5 | 48/12 | o | x | o | o |
| 6 | 56/14 | o | x | o | x |
| 7 | 68/17 | o | x | x | o |
| 8 | 80/20 | o | x | x | x |
| 9 | 96/24 | x | o | o | o |
| 10 | 112/28 | x | o | o | x |
| 11 | 136/34 | x | o | x | o |
| 12 | 160/40 | x | o | x | x |
| 13 | 192/48 | x | x | o | o |
| 14 | 224/56 | x | x | o | x |
| 15 | 272/68 | x | x | x | o |
| 16 | 320/80 | x | x | x | x |

Referring to FIG. 26, the four switches S1–S4 are diagrammatically represented to indicate that each has a pair of normally open contacts designated by the second numeral "1" and a pair of normally open contacts designated by the second subscript 2. Taking the switch S1 as an example, the contacts S1–1 will be closed, and the contacts S1–2 will be open when that particular switch is actuated.

It is to be understood from the foregoing that a permutation switch assembly such as that described may be constructed to employ any number of individual switches with a corresponding number of cams. If a plurality of switches S1, S2 . . . Sn are employed, then a corresponding plurality of cams C1, C2, . . . Cn will be used, each of the cams having a number of radial transitions and a number of alternately large and small radius peripheral portions equal to 2 raised to the power of the subscript which designates that particular cam. That is, the number of transitions on the $n$th cam would equal $2^n$. All of the switches may be mounted in angularly spaced relation about the cam-carrying shaft and provided with trip plates engaging the actuator of the corresponding switch, together with a follower tab riding on a corresponding one of the cams. For example, if a fifth switch and a fifth cam were added to the assembly shown in FIGS. 8–15, then it would be possible to energize the five switches in a total of thirty-two possible combinations. In that case, of course, the detent means would be constructed to hold the shaft at any one of thirty-two angular positions and the fifth cam would have thirty-two transitions between relatively short and long radial portions.

The connections of the several switch contacts described above into control circuit of the multi-speed transmission will be detailed below.

CUTTING SPEED CONTROL MEANS

As indicated above, the saddle 44 is feedable horizontally and radially relative to the table 32 along ways 45 on the rail 40 (FIG. 1). The power for such feeding movement may be taken by a gearing connection from the multi-speed transmission itself. The rate of such feeding movement is controlled by the rotary feed selector 50 and the direction of such feeding movement by a swivel direction selector lever 250 as more fully described and claimed in applicant's copending U.S. application Serial No. 526,272, filed August 3, 1955, and issued as Patent No. 2,831,361 on April 22, 1958 (as per admt. 6/19/59).

It has been recognized in the past that the maximum speed with which any machining operation may be successfully carried out is dependent upon the material and characteristics of the particular workpiece and the particular cutting tool being used. It is important both in the interest of efficiency and uniform finish on the workpiece to maintain the cutting speed, i.e., the rate at which the cutting tool moves relative to the surface of the workpiece in a cutting direction substantially constant and near the maximum permissible value. This objective has been met in the past by relatively complex gearing or electronic controls which, in theory at least, maintain the cutting speed of a tool along a spiral path almost perfectly constant as it advanced radially across a workpiece. In other words, the speed of the work table was smoothly increased as a tool was fed inwardly from the periphery toward the center of the workpiece. Most common means for effecting this as smooth change in table speed included a variable speed motor drive together with elaborate motor speed control circuitry. Such equipment is, of course, quite expensive, and often fails to produce the theoretically perfect result of an absolutely constant cutting speed.

In accordance with an important aspect of this invention, means are provided, in combination with a multi-speed transmission, for automatically varying the speed of a rotatable work support in steps according to zones of radial distance of the feedable tool or tool holder from the axis of the work support. The speed of the table increases as the tool holder is fed radially inward of the table so that a substantially constant cutting speed is maintained.

In carrying out the invention, a second permutation switch assembly 38A (FIG. 21), substantially identical to that described in connection with FIGS. 8–15 except for the omission of the manual knob 216, is employed. Such second switch assembly is connectable in control of the multi-speed transmission clutches and brakes in lieu of the first. It is positioned or stepped progressively in response to movement of the tool holder from one radial zone to the next. Additionally, a manual knob is connected with the second switch assembly to permit adjustments in the particular value of the cutting speed which is substantially maintained by this step control.

In the preferred form, the actuation of the cutting speed control means is derived from the position of an indicator scale which moves in proportion to feed movements of a tool holder. As shown in FIG. 17, the indicator scale 49 for the saddle 44 is made as an angular ring and connected by gears 255, 256 with a shaft 258. The gears 255 and 256 form part of a high ratio reduction mechanism such that the scale 49 moves through one revolution as the shaft 258 makes many turns. The indicator scale arrangement includes a stationary index ring 259 and a micro-dial 260, the whole being constructed and arranged as described in applicant's copending application Serial No. 446,195, filed July 28, 1954, now Patent No. 2,743,699.

Referring to schematic FIG. 29, it will be seen that the saddle is positioned transversely of the work table upon rotation of a lead screw 258a. The latter is geared to the shaft 258 so that the scale 49 rotates in timed relation to movement of the saddle and the cutters it carries. The angular position of the scale 49 thus indicates the position of the cutter radially of the work table. Since it is important here only to understand that the scale 49 rotates through approximately one revolution in proportion to the permissible feed range of the saddle 44, the details of the scale and micro-dial mechanism will not be described. However, for effecting stepped table speed control, and as indicated above, the cutting speed control, the scale 49 is provided with an annular recess 44a (FIG. 17) which receives a plurality of rotatable trip rings 261 interleaved between a corresponding plurality of spacer rings 262. The spacer rings have a series of circularly spaced holes therethrough which receive a corresponding plurality of mounting pins 264, while the trip rings 261 are made of proper internal diameter such that they rotatably surround the pins 264. A set screw 265 may be employed to clamp the rings 261, 262 together after the latter is rotationally adjusted relative to the scale 49.

In the present instance, the innermost trip ring 261a is formed with a plurality of radially extending tabs or dogs 266 (FIG. 18) which are geometrically spaced apart over about one-fourth of the ring's circumference. A plurality of radial notches 268 may also be cut in the ring 261a to receive a wrench or small pin for manually rotating the ring on the pins 264 when the set screw 265 is loosened.

Disposed on the face of the head 48 is a cutting speed control mechanism 270 which includes a spoke wheel 271 (FIG. 20) having its radial legs in the path of the dogs 266 on the ring 261. A detent star wheel 272 and a small spur gear 274 are axially stacked on the spoke wheel 271, the three being locked together by rivets 275 and rotatably mounted on a stud 276. A detent ball 278 is urged by a compression spring 279 between the adjacent prongs of the star wheel 272 to prevent backlash and maintain the spoke wheel 271 in a fixed angular position except when one of its spokes is tripped by one of the dogs 266. This positively rotates the spoke wheel and the gear 274 through one-eighth of one revolution. The cutting speed control arrangement further includes a manually indexible knob 282 projecting from a face plate 284 and locked by means of a set screw 285 on a short shaft 286 which is piloted at 288 in a differential shaft 289.

As shown best in FIG. 16, the face plate 284 is inscribed with indicia at eight angular locations and which may indicate a selected cutting speed directly in feet per minute when read opposite an index mark on the rotatable knob 282. The arrangement here considered therefore, permits an operator, by setting the knob 282, to select operation of the turret lathe at any one of eight cutting speeds which will be maintained substantially constant as feeding of the tool holder progresses. Of course, with the range control planetary gear set 94 shifted to its other position, eight additional cutting speeds maintained by the present mechanism are available.

To permit the second switch assembly 38A to be indexed either by movement of the spoke wheel 271 or by rotation of the knob 282, and in such a manner that the indicia on the face plate 284 always indicate the cutting speed which will be approximately maintained, an integrating device in the form of a differential is employed. Referring for the moment to FIG. 23, the differential includes a first terminal or input member in the form of a sun gear 290 which is drivingly connected with the knob 282 by being fixed on the piloted shaft 286. A second terminal member in the form of an input sun gear 291 is drivingly connected to the spoke wheel 271 by means of an idler gear 292 meshing with the gear 274 on one side and with an axial extension of the sun gear 291 on the other side. The sun gear 291 may be disposed on but rotatable relative to the main shaft 289 which rigidly carries an intermediate member of the differential in the form of a planet carrier 294. The carrier holds a first plurality (in this instance two) of planet gears 295 which mesh with the first sun gear 290, and a second plurality of planet gears 296 which mesh with the second sun gear 291. The shaft 289 extends rearwardly to support the cams of the second switch assembly 38A which is constructed in a manner substantially identical to that described above for the assembly 38. It will be observed from diagrammatic FIG. 23 that the second switch assembly 38a includes four switches CS1, CS2, CS3, and CS4, which are actuated by individual cams in the sixteen combinations according to the rotational position of the shaft 289.

With reference to FIG. 21, the face plate 284 is provided with a series of eight circularly spaced holes 284a into which a pin 282a carried by the knob 282 may be inserted to lock the knob on a given setting. The shaft 286 may be pulled slightly forwardly against the force of a biasing spring 300 whenever the knob 282 is to be rotated. Otherwise, the knob 282, the shaft 286 and the first sun gear 290 on that shaft are held against rotation by the detent 282a.

The gear ratios in the differential shaft are such that the main shaft 289 rotates through one-half the angle of the knob 282 or the sun gear 291 whenever the other is held stationary. It will, therefore, be apparent that once the knob 282 has been set to a selected position and the switches CS1-4 given an initial actuation pattern, rotation of the trip ring 261a with the scale 49 as the saddle 44 is fed, results in stepping of the spoke wheel 271 and the consequent stepping movement of the shaft 289 so that the switches CS1 and CS4 are actuated in different combinations as the tool is fed inwardly or outwardly. In the present case, these dogs are spaced apart by distances which have geometric variations so that as the tool is fed inwardly the table speed increases, at predetermined feed points, more and more frequently.

It is possible, however, that in performing a variety of machining operations, such widely different tools may be employed that their cutting surfaces vary laterally relative to the tool holder or saddle 44. This would affect, to some extent, the radial position of the tool cutting surface on the workpiece when the trip dogs 266 effect table speed changes. To permit correction of this variation as different tools are employed, the entire trip ring 261a may itself be "phased" relative to the scale 49. It is only necessary that the operator loosen the set screw 265 (FIG. 17) insert a tool (such as the long end of an Allen wrench used to loosen the screw) into one of the notches 268 (FIG. 18) and rotate the trip ring 261a about the pins 264 relative to the scale. In order that these adjustments may be made quickly and accurately, the trip ring 261a may be formed, as shown in FIG. 19, with a suitable scale reading directly against an index mark 262a on adjacent stationary spacer ring 262 in the amount that the tool is off center with respect to the tool holder.

The spoke wheel 271 and the shaft or the switch assembly 38A are stepped in one direction or the other according to whether the tool holder is being fed radially inwardly or outward of the work supporting table 32. If the feeding movement is radially inwardly, the stepping movement is such that the table speed is progressively increased in steps so that the cutting speed of the tool relative to the workpiece is varied in steps. Conversely, if the feed is radially outward, the spoke wheel is stepped in opposite direction so that the switch assembly 38A causes progressive step decreases in the table speed to maintain the cutting speed of the tool substantially constant.

It is important to consider in the light of the simplicity of this cutting speed control the results which it produces in contrast with the more conventional and complex prior arrangements achieving theoretically constant cutting speed means. Referring to FIG. 24, the reciprocal of table speed is plotted against the tool (i.e., distant of the tool radially from the center of the table) for a constant tool feed rate. First, the line 305 illustrates the results of constant table speed (at a maximum value when the tool has its maximum radius from the center of the work table). A graph line 306 illustrates the condition in which the table speed is uniformly increased as the tool moves radially inward of the workpiece. The area under the line 305 represents the total time necessary to effect a radial cut completely across a workpiece with the table driven at constant speed. On the other hand, the double hatched area under the line 306 represents the time required for completing a facing cut across a workpiece if the table speed is uniformly increased to maintain the tool cutting speed at a predetermined value. It will be observed that the second area is exactly one-half of the first, i.e., that only one-half the time for a given machining operation is required if the table speed is decreased uniformly with increasing tool radius, than if the table speed is held constant.

FIG. 25 shows, in a similar manner, the amount of time required for completing a facing cut across a workpiece by employing stepped table speed changes to maintain the cutting speed only substantially constant as the tool is fed radially of the workpiece. Beginning at the right, the table is operated at a fairly low speed represented by the line 308 and after the tool is moved inwardly a short distance a table speed is increased to a value represented by the line 309. These increases in table speed occur progressively more rapidly as the tool moves inwardly as illustrated by the successive lines 310–316. The total area under these table speed lines 308–316 represents the time required to complete the facing cut by controlling the table speed in the manner described.

For purposes of comparison, the line 306 from FIG. 24 has been reproduced in FIG. 25. It will be evident that the difference in area beneath the line 306 and beneath the lines 308–316 is relatively small, the difference being only the sum of several small wedge-shaped sections 318. It has been found in actual practice that the stepped table speed control to produce this type of cutting speed control requires only eight percent more time to perform a given facing or cutting operation than in the case where theoretically perfect control represented by the line 306 is obtained. The present invention thus permits the use of the very simplified controls described above, but at a sacrifice of only eight percent in time efficiency.

CONTROL CIRCUITS

The controls for the transmission 35 include circuits interconnecting the brake coils 90b–93b, clutch coils 90c–93c, the main brake coil 201, and the two selector switch assemblies 38 and 38A. In addition to these components, the pendant 39 (FIG. 8) carries three switches illustrated at J, R, and CS in FIG. 28. The jog switch J is mounted at the rear of the assembly 38 (FIG. 10) and has normally open contacts J1 and normally closed contacts J2 (FIG. 28) which are actuated by depressing the push button 244 in the center of the knob 216. A push button 320 (FIG. 8) controls normally open contacts 330 (FIG. 28). The pendant also carries a rotatable collar 321 partially surrounding the push button 320 and having an index mark 321a which may be brought into alinement with the words "run" "off" and "CS." This collar is normally spring biased to the center "off" position shown, but upon rotation to the left it causes the contacts R of a "run" switch (FIG. 28) to be momentarily closed. Conversely, rotation of the collar 321 to the right causes momentary closure of the switch contacts CS in FIG. 28. An arm 323 depending from the pendant 39 (FIG. 8) associated with an "off" switch (not visible) is operative when deflected, to open "off" contacts shown in FIG. 28.

Referring in more detail to FIG. 28, the main drive motor 36 is energized from a suitable three-phase voltage source through normally open contacts R1a R1b, and R1c controlled by a starter contactor coil R1. The control circuit itself is supplied with alternating voltage across the lines L1, L2 by a transformer T which has its primary winding connected across two of the three-phase supply lines. The motor 36 is started by depressing the push button 320 which closes the contacts 330 and energizes the coil R1, the latter closing the contacts R1a, R1b, and R1c and sealing in through normally open contacts R1d. The motor 36 may be stopped by depressing a normally closed push button switch 331 which drops out the contactor R1.

For energizing the several brake coils and clutch coils, a rectifier 332 is connected across the alternating current lines L1, L2, its output terminals being connected to D.C. lines L3, L4. The main brake coil 201 is connected across the latter lines through normally closed series contacts R2a and R3a controlled by the energization of coils R2 and R3, respectively. The clutch coil 90c and the brake coil 90b are connected across the lines L3, L4 jointly through normally open contacts R2b and R3b (in parallel) and thence individually through normally open contacts R4a and normally closed contacts R4b controlled by a relay coil R4. The brake coil 91b and the clutch coil 91c are individually connected across the D.C. lines through normally open contacts R5a and normally closed contacts R5b respectively, controlled by a relay coil R5. In a similar manner, normally open contacts R6a and normally closed contacts R6b actuated upon energization of a relay R6 control the energization of the brake coil 92b and the clutch coil 92c, respectively. Energization of the clutch coil 93c and of the brake coil 93b is governed by normally open contacts R7a and normally closed contacts R7b, respectively, actuated by a relay coil R7.

To complementally energize the brake coils and clutch coils in various combinations, the relay coils R4–R7 are connected in circuit with the normally open contacts S2–1, S3–1, S4–1, and S1–1, respectively. As shown, these selector switch assembly contacts are connected to the supply line L1 through the normally closed "off" contacts and through the normally closed jogging contacts J2. The selector switch contacts S2–1, S3–1, S4–1, and S1–1 lead respectively through normally closed contacts R8a, R8b, R8c, and R8d, controlled by a relay coil R8, to the coils R4–R7.

Connected in parallel with the contacts S2–1 and R8a, are the contacts CS2–1 in series with normally open contacts R8e. In a similar manner, the contacts CS3–1 and R8f are connected in parallel with contacts S3–1 and R8b; likewise, contacts CS4–1 and R8g are connected in parallel with contacts S4–1 and R8c; while contacts CS1–1 and R8h are connected in parallel with contacts S1–1 and R8d.

The relay coil R3 is connected across the lines L1, L2 through "off" contacts and the J2 contacts, as well as the normally open R contacts. Momentary closure of the switch contacts R, therefore, energizes the coil R3 (FIG. 28) and pick-up of its normally open contacts R3c seals it in through normally closed contacts R8i controlled by the relay coil R8. Energization of the coil R3 also opens the contacts R3a to release the brake 201 (FIG. 3) and closes the contacts R3b (FIG. 28) so that both the clutch coil 90c and brake coil 90b are no longer de-energized and the intermediate member 109 (FIG. 3) is no longer left in "neutral." Thus, as the knob 216 (FIGS. 8 and 10) of the rotary speed selector switch assembly 38 is turned to different ones of its angular positions, the switch contacts S–1 through S4–1 (FIG. 28) are actuated in various combinations so that the relays R4–R7 are similarly actuated. As a result, the brake coils 90b–93b and the clutch coils 93b and 93c are complementally energized in any one of sixteen possible combinations to produce the particular table speed determined by the rotational setting of the knob 216. Any of the sixteen speeds for the work table (see the first chart, supra) may thus be selected by angularly setting the knob 216. While operating under these conditions, the transmission may be shifted to produce any other desired table speed simply by rotating the selector knob 216 to the proper angular position. There is no need first to stop the main drive motor 36 or to remove the load on the transmission by disengaging a cutting tool from a workpiece carried on the table. It will be observed that since the switch contacts S4–1 are operated every time the speed is changed (see the second chart, supra), and since these contacts control the energization of the relay coil R6 (FIG. 28) which in turn controls the energization of the clutch coil 92c and brake coil 92b, the latter two coils are reversed in their energization each time that the rotary selector switch 38 is reindexed. Therefore, the intermediate element or ring gear 170 of the gear set 92 (FIGS. 3 and 4) is always left momentarily free when a speed change occurs. Accordingly, as explained above, this ring gear is driven at a fairly high rate to store kinetic energy and thus minimize impact on the table due to the shifting of the transmission.

When it is desired to have the table speed change automatically according to the zone of radial distance of the tool holder from the axis of the work table, and thus achieve control of the cutting speed, the switch contacts CS (FIG. 28) are momentarily closed. These contacts are in series with the relay coil RC8 across the lines L1, L2, but they are also in a series with the contacts S1–2, S2–2, S3–2, and S4–2 leading from the normally closed "off" and J2 contacts. These four contacts S1–2, through S4–2 must all be closed (and the contacts S1–1 through S4–1 all open) before the relay coil R8 may be energized. Thus, in accordance with one feature of the invention, it is necessary that the operator first set the knob 216 (FIGS. 8 and 10) of the speed selector switch assembly 38 at the position giving the lowest speed in a given range before cutting speed control can be obtained (see position No. 1, second chart, supra). Conversely, if the operator should for any reason move the knob 216 while the machine is operating under automatic cutting speed control, one of the contacts S1–2 through S4–2 (FIG. 28) will be opened and the coil R8 will be energized. With this, the transmission and the table speed are again under the control of the manual selector switch assembly 38 on the pendant. Accordingly, the table is driven at a speed which the operator selects by setting the knob 216.

To place the machine under automatic cutting speed control, the manual selector switch 38 (FIG. 8) is set to the position which would result in the lowest table speed for a given range, so that the contacts S1–2 through S4–2 (FIG. 28) are all closed. The CS switch is then momentarily closed to energize the relay coil R8 which seals in through its normally open contacts R8j. Normally open contacts R8k close to energize the relay coil R3. This, in turn, opens the contacts R3a to de-energize the brake coil 201 and closes the contacts R3b so that the first gear set 90 (FIG. 3) is no longer in "neutral."

Pick-up of the relay coil R8 also opens the contacts R8a through R8d and closes the contacts R8e through R8h so that the contacts CS2–1, CS3–1, CS4–1, and CS1–1, (FIG. 28) are in control of the relays R4 through R7, respectively. As the switch assembly 38A is indexed manually by turning the knob 282 (FIG. 23), or automatically by the trip ring 261 as the saddle 44 (FIG. 29) is fed through different radial zones relative to the table 32, the contacts CS1–1 through CS4–1 are closed and opened in different combinations thereby energizing the relays R4 through R7 in different patterns. The brake coils 90b through 93b and their corresponding clutch coils 90c through 93c are thus complementally energized in permutated combinations to cause the table to be driven at different ones of the sixteen possible speeds. As the saddle 44 and the tool holder moving horizontally therewith are fed into different radial zones, the switches CS1–1 through CS4–1 thus automatically result in stepped changes of the table speed with the linear speed between a workpiece and a tool being maintained substantially constant as illustrated by the graph in FIG. 25.

It will be apparent, therefore, that closing the "run" switch (FIG. 28) places the manual speed selector 38 (the switch contacts S1–1 through S4–1) in control of the multi-speed transmission, while momentary closure of the switch CS places the cutting speed control switch assembly 38A in control of the transmission. However, before closure of the switch CS can have any effect, the manual selector 38 must be placed in the lowest speed position. Once the relay R8 has been energized, if the manual selector 38 should be moved, one of the contacts S1–2 through S4–2 will open. This will de-energize the relay R8 and open the contacts R8k which, in turn, will drop out the relay R3. With this, the contacts R3d open to place the gear set 90 in "neutral" and the contacts R3 close to energize the brake and stop the table. Closure of the switch R then again sets the table in motion at a speed determined by the setting of the manual selector.

Of course, the table may be stopped at any time when operating under the control of the manual selector 38 or the cutting speed control selector 38A simply by opening the "off" switch.

To jog the table, it is only necessary for the operator to intermittently close the switch J. The contacts J1 (FIG. 28) energize the relay coil R2 so that the contacts R2a open to release the brake 201 (FIG. 3) and the contacts R2b, close to take the gear set 90 (FIG. 3) out of neutral. Opening of the contacts J2 has an effect similar to actuation of the "off" switch, namely, the connection of relays R4 through R7 to the line L1 is broken so that those relays remain de-energized regardless of the condition of the switch contacts S1–1 through S4–1. With all of these relays de-energized, the brake coils and clutch coils are energized in such pattern as to produce the greatest over-all speed reduction ratio in the transmission (see first chart, supra). Thus, whenever the table is jogged, it always moves at the lowest speed available in the particular speed range being employed, and without a separate resetting of the rotary speed selector knob 216.

RÉSUMÉ OF OPERATION

While the operation and advantages of the present multi-speed transmission and its controls will be apparent from the foregoing description, a brief résumé may be helpful. The transmission 35 itself includes a plurality of tandemly connected planetary gear sets 90, 91, 92 and 93 (FIGS. 3 and 4) each of which is capable of producing one of two drive ratios according to whether its intermediate element is held stationary or fast to one of its terminal members. For this purpose, electro-magnetic brakes 90b–93b and clutches 90c–93c are employed together with a control circuit (FIG. 28) for complementally energizing those brakes and clutches in permutated patterns (see first chart, supra). As each change in the over-all transmission ratio is made, the gear set 92 is always shifted. In the present case, that particular one of the gear sets is constructed to include means for driving its intermediate member 170 at a relatively high speed during the transmission period when it is held neither stationary nor locked to a terminal element. As each speed change is made, this particular intermediate element rotates relatively fast, thus storing a considerable amount of kinetic energy to reduce impact on the transmission parts. A part of this energy is returned as the intermediate element is reclutched or rebraked, and a part is dissipated as heat at the clutch or brake surfaces.

To energize the several clutches 90c–93c and brakes 90b–93b in different patterns, an extremely compact rotary permutation switch 38 is employed (FIGS. 8–15). This switch is manually indexable and may be carried in a movable pendant of the machine. However, a second permutation switch assembly 38A is also provided and connectable in controlling relation to the transmission in lieu of the first. The second switch assembly 38A is stepped successively as the tool holder is fed through different zones radially of the work table 32, and by means of a differential (FIGS. 20–23), the second switch assembly 38A is stepped either by indexing of a manual knob 282 to select a particular cutting speed value, or by means 261, 271 rotatable with a feed indicator scale 49. In this manner, the cutting speed is maintained substantially constant as the tool moves radially of the work. Changing the table speed in steps thus produces a time efficiency for a cutting or facing operation which is only slightly less than the efficiency obtainable with a much more elaborate apparatus giving theoretically constant cutting speed control.

The present application is a continuation of applicant's copending application Serial No. 525,469, filed August 1, 1955, now abandoned.

I claim:

1. In combination, a multi-speed transmission having a rotatably driven input shaft and an output shaft, said transmission including a plurality of planetary gear sets drivingly interposed between said input shaft and said output shaft, each of said gear sets having an electric brake and an electric clutch to respectively effect different speed change ratios when energized, a speed selector permutation control switch assembly including a manually adjustable member and a plurality of switches for complementally energizing said brakes and clutches in different combinations according to the position of said adjustable member, a second permutation control switch assembly including a rotatable shaft and a plurality of switches for complementally energizing said brakes and clutches in different combinations according to the position of said shaft, means for selectively rendering one or the other of said two switch assemblies operative to control said brakes and clutches, a translatable member mounted for movement along a path, a circular scale and means connecting it with said translatable member to be rotated according to movements of and to indicate the position of the translatable member, a ring fixed to said scale and having radial dogs spaced at predetermined locations therearound, a star wheel and detent mechanism located to be tripped through a predetermined angle by each of said dogs as the scale rotates, a rotatable knob manually indexable to a plurality of positions, and a differential having two sun wheels drivingly connected respectively with said star wheel and said knob and having a planet carrier drivingly connected with said second switch assembly shaft.

2. In combination, a multi-speed transmission having a rotatably driven input shaft and an output shaft, means including a permutation switch assembly having a rotatably positionable control shaft for changing the speed ratio of said transmission according to the indexed position of said control shaft, a rotatable knob manually indexable to any of a plurality of positions, a translatable member movable along a predetermined path divided into zones, a rotatable control member and means drivingly connecting it with said translatable member to be indexed in steps according to the zones through which the latter moves, a differential gear having two sun wheels drivingly connected respectively to said knob and said control member, and further having a planet carrier drivingly connected to said switch assembly control shaft, whereby said switch assembly is stepped to change the drive ratio of said transmission in steps as said translatable member moves through successive zones along its path, the initial speed ratio of said transmission being selected by the angular setting of said knob.

3. In combination, a multi-speed transmission having a rotatably driven input shaft and an output shaft, a switch assembly including a control shaft rotatable to a plurality of positions, means for adjusting the speed ratio of said transmission according to the rotational position of said control shaft, a rotatable knob manually indexable to a plurality of positions, a translatable element movable along a path having a plurality of zones, a rotatable member together with means for indexing the same to successive angular positions as said translatable element moves through successive zones of said path, a differential gear having two terminal members drivingly connected respectively with said knob and said rotatable member and having an intermediate element drivingly connected with said control shaft, whereby the speed of said output shaft is step-adjusted according to the radial zone of said translatable element and the initial speed from which such adjustments take place is selectable by setting said knob.

4. In combination, a multi-speed transmission having a rotatably driven input shaft and an output shaft and including a plurality of two-speed planetary gear sets each controlled by an electric brake and an electric clutch, a manually indexable permutation control switch assembly and circuit connections therewith for complementally energizing said brakes and clutches in a plurality of combinations to produce a plurality of speeds of said output shaft, a member translatable along a path having a plurality of zones, a scale rotatable in proportion to the movements of said translatable member for indicating the position of the latter, a second indexable permutation control switch assembly, means carried by said scale for indexing said second switch assembly in steps according to the zone of said path in which said translatable elements resides, and circuit means for connecting said second switch assembly in control of said brakes and clutches to thereby adjust the speed of said output shaft in steps according to the zones of said path through which said element moves.

5. In combination, a rotatable element, a multi-speed transmission having a rotatably driven input shaft and having an output shaft connected to drive said rotatable element, said transmission including a plurality of two-speed planetary gear sets each controlled by an electric brake and an electric clutch, manual selector switch means for complementally energizing each brake and clutch to effect drive of said rotatable element at any one of a plurality of speeds, an element movable along a path radial to the axis of said rotatable element and divided into a plurality of zones, and automatic selector switch means responsive to the movement of said translatable element through successive ones of said zones for complementally energizing each brake and clutch to make the speed of said rotatable element vary in steps as said translatable element passes through successive zones.

6. In combination, a rotatable element, a speed change transmission having a rotatably driven input shaft and connected through a plurality of two-ratio gear sets to drive said rotatable element, control means for placing each of said gear sets in either of their ratios, an element translatable to different positions along a path radial to the axis of said rotatable element, and means responsive to the position of said translatable element and operative upon said control means to adjust the speed of said rotatable element according to zones of radial distance of said translatable element from the axis of said rotatable element.

7. In combination, a multi-speed transmission having a rotatably driven input shaft and an output shaft and including a plurality of tandemly connected two speed gear sets each having electromagnetic means for changing the speed ratio afforded thereby, a first permutation switch assembly including a manually adjustable member and a plurality of switches actuated in different combinations according to the position of said member, means connecting said switches to energize the electromagnetic means in said transmission in different combinations according to the position of said adjustable member, a second permutation switch assembly including a rotary member and a plurality of switches actuated in different combinations according to the position of said rotary member, a translatable element movable to different positions along a path, means connecting said rotary member to be positioned according to the position of said translatable element, control means for disconnecting the switches of said first assembly from, and connecting the switches of said second assembly into controlling relationship with the electromagnetic means in said transmission, means for preventing actuation of said control means unless said adjustable member of said first switch assembly is in a predetermined position causing the greatest speed reduction ratio afforded by said transmission, and means for deactuating said control means when said adjustable member of said first switch assembly is moved from said predetermined position while the switches of said second assembly are in controlling relationship with said electromagnetic means.

8. In combination, a multi-speed transmission having a rotatably driven input shaft and an output shaft, a manually operated first control means for selectively setting said transmission to any one of its speed ratios, an element translatable to different positions along a path, a second control means connected with said translatable element for selectively setting said transmission to any one of its speed ratios according to the position of the translatable element, selector means for connecting either of said first or second control means into operative relationship with said transmission, and means for preventing operation of said selector means to connect said second control means into operative relationship with said transmission unless the latter is operating at its lowest speed ratio.

9. For use with a multi-speed transmission for rotatably driving a massive element from a prime mover, such transmission having a plurality of tandemly connected two speed planetary gear sets each including a pair of terminal elements and an intermediate element interconnected by planet gears together with an electric brake and clutch for respectively holding the intermediate element stationary or fast to one of the terminal elements, a control system comprising, in combination, a rotatably indexable permutation control switch assembly including one control switch for each of said gear sets, a relay having normally closed and normally open contacts for complementarily energizing the brake and clutch of each of said gear sets, said relays being energized by respective ones of said control switches in various combinations to provide a plurality of over-all speed change ratios for the transmission, the greatest speed reduction ratio resulting when all of said relays are deenergized, and a jogging switch connected to deenergize all of the relays when it is actuated so that the massive element is driven at the lowest speed afforded by the transmission regardless of the setting of said permutation control switch assembly.

10. In a multi-speed transmission for driving a massive machine tool element from a prime mover, the combination comprising a plurality of speed change planetary gear sets connected in tandem relation between the prime mover and the source, each of said gear sets including two terminal members and an intermediate member interconnected by planet gears together with an electric brake and an electric clutch for respectively holding the intermediate member stationary or fast to one of the terminal elements, circuit means including a permutation control switch assembly for complementarily energizing the brake and clutch for each gear set in a plurality of combinations to provide a corresponding plurality of over-all speed change ratios, a switch for jogging the machine tool element, and circuit connections for energizing said clutches and brakes in combination producing the greatest over-all speed reduction whenever said jogging switch is closed regardless of setting of said permutation control switch assembly.

11. In a multi-speed transmission for driving a massive machine tool element from a prime mover, the combination comprising a plurality of planetary gear sets connected in tandem relation, each of said gear sets including two terminal members and an intermediate member interconnected by planet gears together with an electric clutch and an electric brake for holding the intermediate member stationary or fast to one of the terminal elements, respectively, means including a permutation control switch assembly for complementarily energizing the brake and clutch for each gear set, said last means including means for switching the energization of the clutch and brake in one of the gear sets each time that said switch assembly is adjusted, and means in said one gear set for making the intermediate element thereof rotate several times faster than the difference in speed of the corresponding terminal elements whenever neither the associated brake nor clutch is energized, whereby said intermediate element stores and releases energy each time the over-all transmission ratio is changed to thus reduce the impact on the parts.

12. In a machine tool having a massive element driven at any of a plurality of speeds from a constant speed prime mover, the combination comprising a multi-speed transmission adapted for driving connection between the prime mover and the massive element, said transmission including a plurality of tandemly connected planetary gear sets each having two terminal elements and an intermediate element interconnected by planet gears together with a pair of electrical clutches for respectively holding the intermediate element stationary or rigid with one of the terminal elements, a control switch assembly having a rotatably indexable manual knob and a switch for each pair of electrical clutches together with means for actuating said switches in permutations, and control means responsive to actuation of each switch to deenergize one clutch and energize the other clutch of the corresponding pair, whereby said transmission may be set to any of its several speed change ratios by fingertip adjustment of said knob.

13. In a machine tool having a massive rotatable element driven from a prime mover, a multi-speed transmission interposed between the prime mover and the element and comprising, in combination, a plurality of two-ratio planetary gear sets connected in tandem relation and having means for selectively operating each at either of its two ratios, an additional planetary gear set connected in tandem with the others and having two terminal elements and an intermediate element interconnected by planet gears together with means for causing said intermediate element to rotate at least three times in excess of the difference in speed of the two terminal elements, means for selectively holding said intermediate element against such rotation and either stationary or fast to one of said terminal elements to place the additional gear set in either of its two ratios, and control means for changing the operating ratio of said additional gear set each time the ratio of one of the other gear sets is changed.

14. In a multi-speed transmission for driving a massive element from a prime mover, the combination comprising a plurality of planetary speed change gear sets connected in tandem relation, and each having two terminal elements and an intermediate element interconnected by planet gears together with means for respectively holding the intermediate element stationary or fast to one of the terminal elements, an additional planetary gear set connected in tandem with the others and having first and second sun gears as input and output members, a common planet carrier with two sets of planet gears thereon meshing respectively with the first and second sun gears, a common ring gear meshing with both said sets of planet gears, and means for respectively holding said ring gear stationary or fast to one of said sun gears, the ratios of the diameters of said sun gears being such as to produce rotation of said ring gear several times faster than the difference in speed of said sun gears when neither of said holding means is effective during a transition from one to the other, the kinetic energy stored by such rotating ring gear thus being partially returned to the massive element as one of said means becomes effective, whereby impact on the massive element as its speed is increased is considerably reduced.

No references cited.